United States Patent
Yoshioka et al.

(10) Patent No.: US 6,478,680 B1
(45) Date of Patent: Nov. 12, 2002

(54) GAME APPARATUS, METHOD OF DISPLAYING MOVING PICTURE, AND GAME PROGRAM PRODUCT

(75) Inventors: Kazuhiko Yoshioka, Osaka (JP); Masashi Kouda, Osaka (JP); Tomohiko Tanabe, Osaka (JP)

(73) Assignee: Square, Co., Ltd., Tokyo (JP)

( * ) Notice: Subject to any disclaimer, the term of this patent is extended or adjusted under 35 U.S.C. 154(b) by 0 days.

(21) Appl. No.: 09/522,362

(22) Filed: Mar. 9, 2000

(30) Foreign Application Priority Data

Mar. 12, 1999 (JP) .......................................... 11-067428

(51) Int. Cl.⁷ ................................................. A63F 9/00
(52) U.S. Cl. ............................... 463/43; 463/1; 463/30; 463/31; 463/32; 345/473; 345/634; 345/581; 345/582; 345/476
(58) Field of Search ........................... 463/43; 345/422, 345/430, 419, 302, 473, 474, 582, 581, 585, 634, 638; 395/127

(56) References Cited

U.S. PATENT DOCUMENTS

| | | | | |
|---|---|---|---|---|
| 5,077,681 A | * | 12/1991 | Miyazawa | 345/419 |
| 5,734,807 A | * | 3/1998 | Sumi | 395/127 |
| 5,870,101 A | * | 2/1999 | Murata et al. | 345/430 |
| 5,926,184 A | * | 7/1999 | Shimizu | 345/422 |

(List continued on next page.)

FOREIGN PATENT DOCUMENTS

| | | |
|---|---|---|
| JP | 6-162165 | 6/1994 |
| JP | 7-110873 | 4/1995 |
| JP | 2627487 | 12/1995 |
| JP | 9-161095 | 6/1997 |
| JP | 10188032 | 7/1998 |
| JP | 10295934 | 11/1998 |
| JP | 11-53565 | 2/1999 |
| JP | 2000-135375 | 5/2000 |

OTHER PUBLICATIONS

Thalmann et al., "Face to Virtual Face" May 1998, IEEE, vol. 86, No. 5 pp. 870–883.*
Wey et al., "Interface: a Real Time Facial Animation System", IEEE, 1997, pp. 1–8.*
Weinhaus et al., "Texture Mapping 3D Models of Real World Scenes", ACM, vol. 29, No. 4, pp. 325–365.*
Weinhaus, "Texture Mapping 3D Models of Real World Scenes", Dec., 1997, ACM, vol. 29, No. 4.*
English Language Abstract of JP 10–295934.
English Language Abstract of JP 2000–135375.
English Language Abstract of JP 10–188032.
English Language Abstract of JP 9–161095.
English Language Abstract of JP 7–110873.
English Language Abstract of JP 6–162165.

*Primary Examiner*—Jessica Harrison
*Assistant Examiner*—Y Cherubin
(74) *Attorney, Agent, or Firm*—Greenblum & Bernstein, P.L.C.

(57) ABSTRACT

A CD-ROM which records a game program and movie data is used to display a movie on part of a face of a character appearing in a game. A predetermined face object is placed in a virtual three-dimensional space. A region of which expression should be changed within the face object is specified. An image data reading unit sequentially reads frame images of movie data representative of a change of expression of the region from the CD-ROM to an image data buffer unit. An image data transferring unit sequentially stores the frame images into a plurality of buffer areas included in a texture data buffer unit, while switching the buffer areas. A texture mapping unit sequentially maps the frame images sequentially stored in the buffer areas within the texture data buffer unit to the region as texture data, in parallel to the storing operation.

12 Claims, 20 Drawing Sheets

U.S. PATENT DOCUMENTS

| | | | |
|---|---|---|---|
| 6,020,892 A | * 2/2000 | Dillon | 345/419 |
| 6,030,289 A | * 2/2000 | Nomi et al. | 463/32 |
| 6,072,496 A | * 6/2000 | Guenter et al. | 345/419 |
| 6,163,322 A | * 12/2000 | LaChapelle | 345/473 |
| 6,232,965 B1 | * 5/2001 | Scott et al. | 345/473 |
| 6,256,040 B1 | * 7/2001 | Tanaka et al. | 345/421 |
| 6,343,987 B2 | * 2/2002 | Hayama et al. | 345/646 |

* cited by examiner

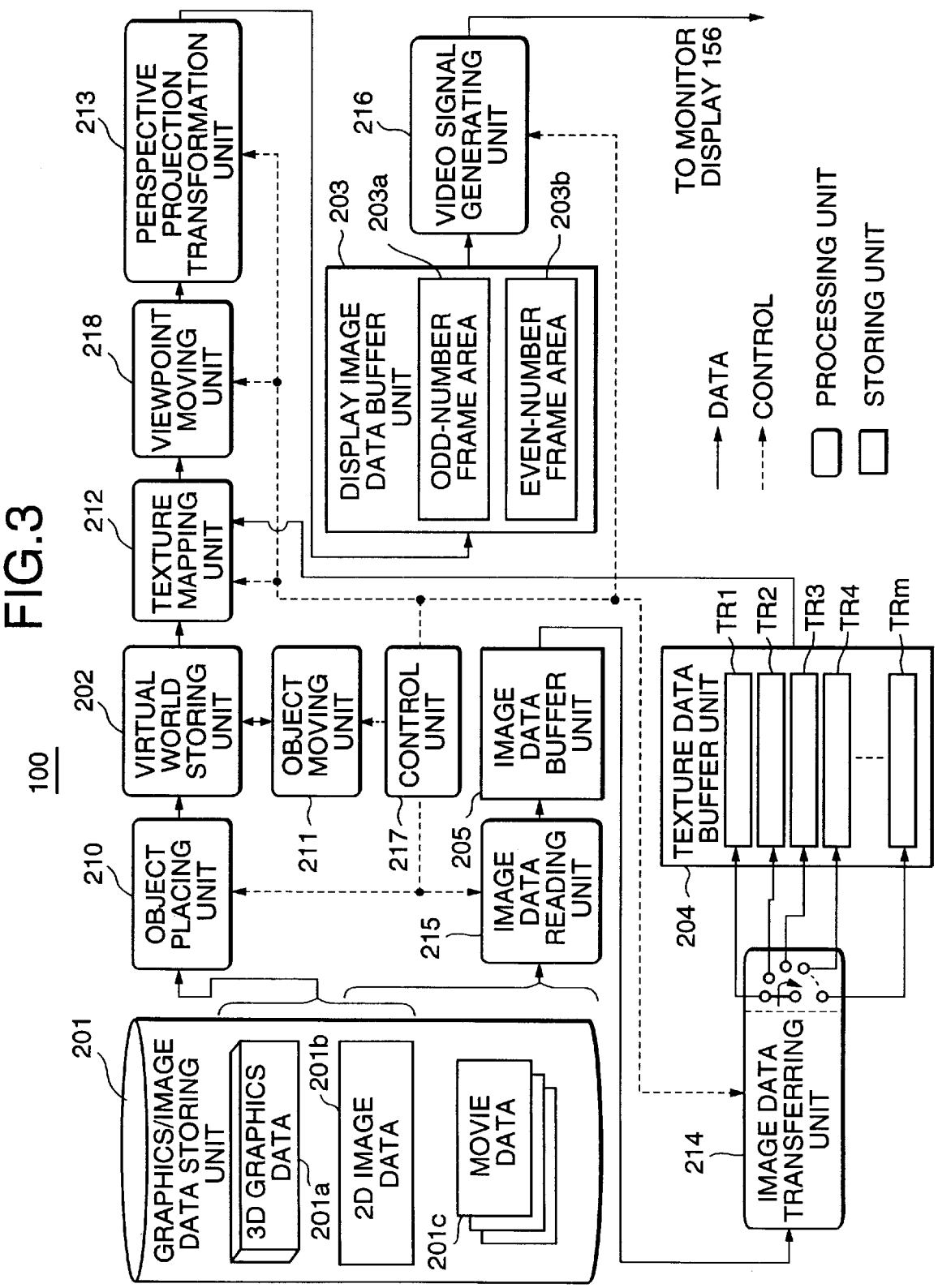

201c-5

201c-6

201c-7

201c-8

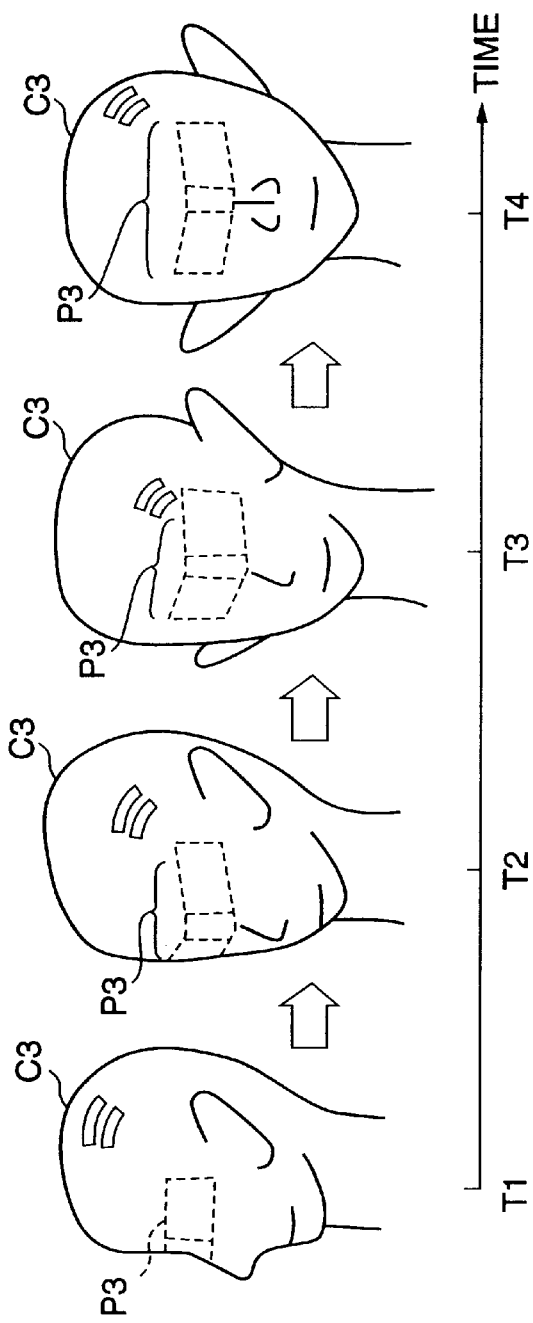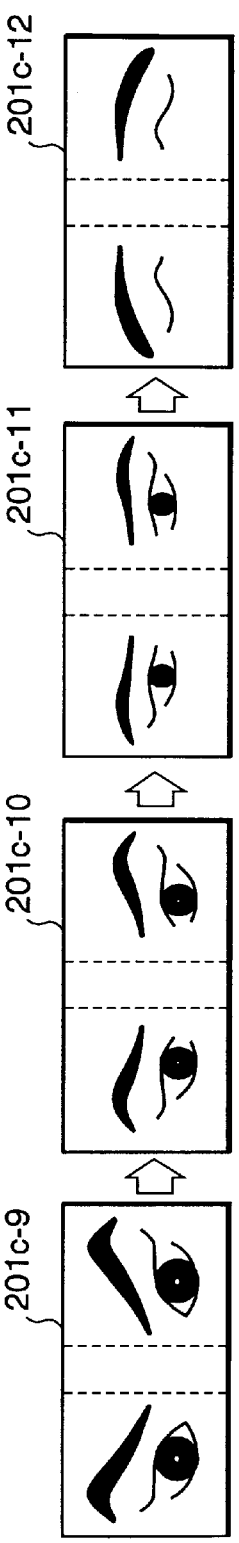

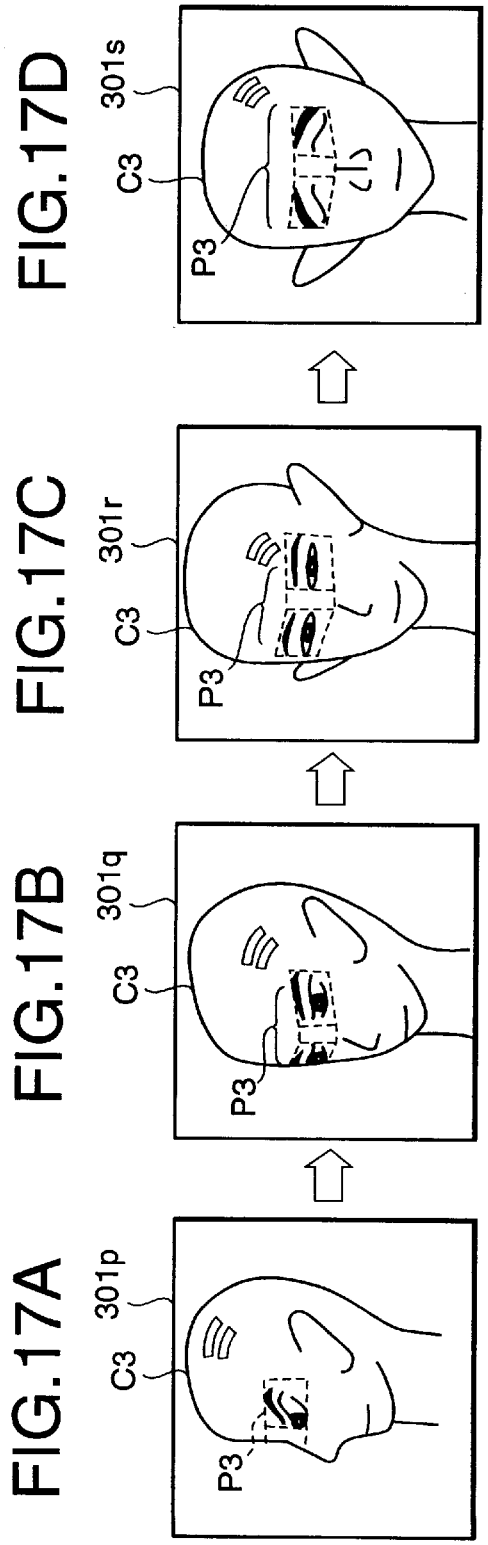
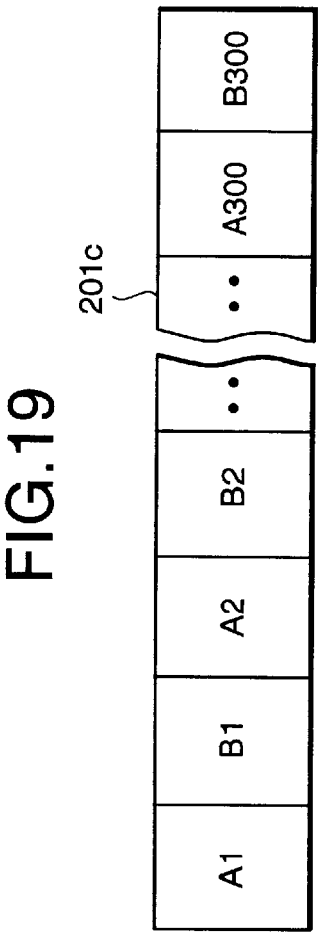
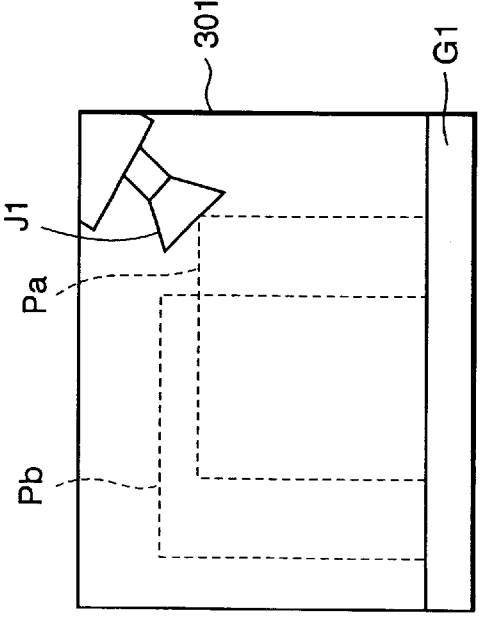
FIG.17A FIG.17B FIG.17C FIG.17D
FIG.18
FIG.19

GAME APPARATUS, METHOD OF DISPLAYING MOVING PICTURE, AND GAME PROGRAM PRODUCT

BACKGROUND OF THE INVENTION

1. Field of the Invention

The present invention relates to a game apparatus which displays moving picture images during execution of a video game, a method of displaying the same and a game program product recorded on a computer readable recording medium.

2. Description of Related Art

In the TV game machine, image processing has come to carry very large weight to enhance commodity value, due to recent development of computer graphics technology. Various image processing technologies are employed in recent games for real time display of successive changes in attribute such as positions, shapes, sizes, colors, etc. of display target objects appearing on a display screen.

The first technology employed is to prepare polygons for a target object (e.g., smoke) which will change in its attribute in real time, to change coordinates of vertexes of those polygons appropriately, if necessary, and to map a texture representative of smoke to each polygon.

The second technology employed is called full animation where multiple temporally successive images are prepared beforehand, and these images are replaced and displayed, successively in real time. This technology is the same as the technology employed for displaying animation in a movie or a television. Successive movement of an object is represented by a set of screen images obtained by dividing the successive movement in units of frames. For instance, moving picture images are displayed by replacing them successively frame by frame in units of $1/60$ second. Hereafter, the technology of representing a moving picture by successively replacing a series of images therefor will be called "movie".

According to the first technology, it is necessary to increase the number of polygons constituting a display target object, such as smoke, if successive changes of the display target object are to be displayed realistically. So, the amount of calculation of movement of the polygons and the amount of processing required for texture mapping increase. As a result, there is a possibility that other processing required for continuation of a video game cannot be executed within a time period predetermined for renewal of display images.

The second technology has an advantage in that it requires a comparatively small processing load. However, each of the images used for the movie is displayed on the entire screen. So, a player is forced to take a standpoint of a spectator, while the movie is reproduced. Such technology is not suitable for a game apparatus which is required to execute interactive operations with a player.

SUMMARY OF THE INVENTION

Therefore, it is an object of the present invention to provide a game apparatus which can display moving picture images in a manner which will result in improvements with real time display and interactive operations, a method of displaying the same, and a game program product recorded on a computer readable recording medium.

To achieve the object, the game apparatus according to the present invention comprises: a CD-ROM recording a game program and movie data used at execution of the game program; and a CPU for reading the game program from the CD-ROM, for executing a game, for reading the movie data from the CD-ROM, and for displaying a movie. Control by the CPU includes: placing a predetermined face image object in a virtual space; and specifying, in polygon units, a region of which expression should be changed within the placed face image object. Control by the CPU further includes: reading movie data predetermined in correspondence to the specified region and recorded in the CD-ROM, for representing change in expression of the specified region; and mapping a movie based on the read movie data to the specified region as a texture, and causing expression of the specified region to be changed and displayed.

According to the present invention, it is possible to map a movie as a texture to a region of which expression should be changed within a face image object placed in a virtual space provided in a game. The mapping is executed based on movie data representing change in expression of the region. So, it is possible to make expression of the face of the object more realistic. Especially when the physical form of the region needs to be changed, it is possible to display the change in the form of the region smoothly by using the movie. Both eyes and their surroundings, for instance, can be effectively used as a region of which expression should be changed. Or, a mouth and its surroundings may be used.

Preferably, the specified region is at least part of a face object of a moving object comprised of polygons. The control by the CPU further includes causing a position on a display screen of the specified region, following movement of the moving object. As a result, it is possible to display change in a physical form of the specified region within the face of a moving object of a game character, etc. without difficulty, and expression of the region can be changed independently of movement of the moving object.

To be specific, the control by the CPU further includes storing the movie data as read from the CD-ROM into a memory which has multiple areas for storing data, while switching the areas in the course of reading the movie data. The mapping includes mapping the movie to the specified region as a texture, based upon the movie data as stored in one of the areas as switched by the switching. As a result, storing and reading of movie data can be executed to different memory areas in parallel, and expression of the region specified in the face can be changed successively.

A method of displaying a movie according to the present invention is executed by reading a game program from a CD-ROM which stores the game program and movie data used at execution of the game program, executing a game, reading the movie data and causing a movie to be displayed. The method comprises: placing a predetermined face image object in a virtual space; and specifying, in polygon units, a region of which expression should be changed within the placed face image object. The method further includes reading movie data predetermined in correspondence to the specified region and recorded in the CD-ROM, for representing change in expression of the specified region; and mapping a movie based on the read movie data to the specified region as a texture, and causing expression of the specified region to be changed and displayed. As a result, the movie can make expression of the region specified in the object of the face image more realistic. Especially when the physical form of the region needs to be changed, it is possible to display the change in the form of the region smoothly by using the movie. Both eyes and their surroundings, for instance, can be effectively used as such a region. Or, a mouth and its surroundings may also be used.

Preferably, the specified region is at least part of a face object of a moving object comprised of polygons. The method further comprises causing a position on a display screen of the specified region, following movement of the moving object. As a result, it is possible to display change in a physical form of the specified region within the face of a moving object of a game character or so, without difficulty, and expression of the region can be changed independently of movement of the moving object.

To be specific, the method further comprises: storing the movie data as read from the CD-ROM into a memory which has multiple areas for storing data, while switching the areas in the course of reading the movie data. The mapping includes mapping the movie to the specified region as a texture, based upon the movie data stored in one of the areas as switched by the switching. As a result, storing and reading of movie data can be executed to different memory areas in parallel, and expression of the specified region within the face can be changed successively.

A game program product according to the present invention is recorded on a computer readable recording medium which stores a game program and movie data to be used during execution of the game program. The game program is programmed so as to cause a computer to execute: placing a predetermined face image object in a virtual space; and specifying in polygon units, a region of which expression should be changed within the placed face image object. The game program is further programmed so as to cause a computer to execute: reading movie data predetermined in correspondence to the specified region and recorded in the CD-ROM, for representing change in expression of the specified region; and mapping a movie based on the read movie data to the specified region as a texture, and causing expression of the specified region to be changed and displayed.

By executing the game program recorded in the recording medium by a computer, expression of the specified region of the face image object can be changed. Especially when the physical form of the region needs to be changed, it is possible to display the change in the form of the region smoothly by using the movie. Both eyes and their surroundings, for instance, can be effectively used as a region of which expression should be changed. Or, a mouth and its surroundings may also be used.

Preferably, the specified region is at least part of a face object of a moving object comprised of polygons. The game program is further programmed so as to cause a computer to execute: causing a position on a display screen of the specified region, following movement of the moving object. As a result, it is possible to display change in a physical form of a region designated in the face of a moving object of a game character or so without difficulty, and expression of the region can be changed independently of movement of the moving object.

To be specific, the game program is further programmed so as to cause a computer to execute: storing the movie data as read from the CD-ROM into a memory which has multiple areas for storing data, while switching the areas in the course of reading the movie data. The mapping includes mapping the movie to the specified region as a texture, based upon the movie data stored in one of the areas as switched by the switching. As a result, storing and reading of movie data can be executed to different memory areas in parallel, and expression of the region specified in the face can be changed successively.

BRIEF DESCRIPTION OF THE DRAWINGS

FIG. 3 is a functional block diagram of the game apparatus.

FIG. 15 depicts an object placed in a three-dimensional virtual space and a group of polygons which is a target of localized reproduction of a movie, in accordance with a fourth example.

FIG. 16A depicts a leading frame image of four exemplary frame images of movie data used as a texture, in accordance with the fourth example.

FIG. 16B depicts a succeeding second one of the four exemplary frame images.

FIG. 16C depicts a further succeeding third one of the four exemplary frame images.

FIG. 16D depicts a still further fourth one of the four succeeding exemplary frame images.

FIG. 17A depicts a leading display screen image of four exemplary display screen images which are sequentially displayed when localized reproduction of a movie is executed, in accordance with the fourth example.

FIG. 17B depicts a succeeding second one of the four exemplary display screen images.

FIG. 17C depicts a further succeeding third one of the four exemplary display screen images.

FIG. 17D depicts a still further fourth one of the four succeeding exemplary display screen images.

FIG. 18 depicts a display screen showing a scene of a game immediately before localized reproduction of a movie is started, in accordance with a fifth example.

FIG. 19 depicts movie data used as a texture, in accordance with the fifth example.

DESCRIPTION OF PREFERRED EMBODIMENTS

Hereafter, embodiments of the present invention will be explained in detail by referring to the accompanying drawings. In the following, a case will be explained where a game apparatus according to the present invention is applied to a home game machine as an example.

[Hardware Configuration]

Figure 1:
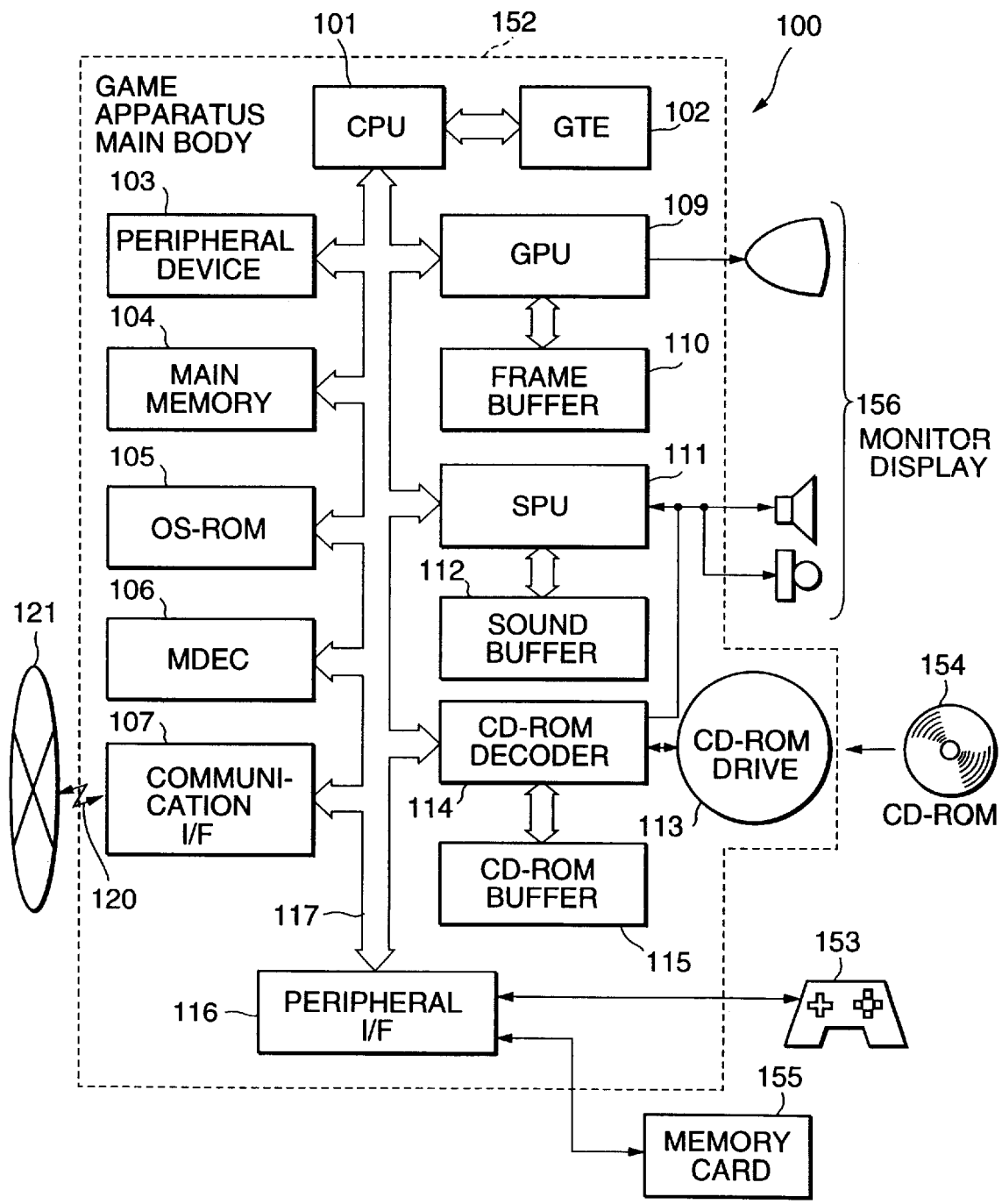
FIG. 1 is a block diagram showing a hardware configuration of a game apparatus according to an embodiment of the present invention.

FIG. 1 is a block diagram of hardware configuration a game apparatus according to an embodiment of the present invention. The game apparatus 100 executes three-dimensional graphic processing based on a game program and image data recorded in CD-ROM 154.

The game apparatus 100 mainly comprises, for instance, a game apparatus main body 152, a controller 153, a memory card 155 and a monitor display 156. The game apparatus main body 152 is a platform which does not depend on the contents of games. The controller 153 inputs operator instructions to the components in the game apparatus main body 152. The memory card 155 stores game data, such as game progression data and game environment setting data. The monitor display 156 displays video images and outputs sound, according to the contents of a game, in response to a video signal and a voice signal, supplied from components of the game apparatus main body 152.

The game apparatus main body 152 comprises, for instance, a central processing unit (CPU) 101, a geometric transform engine (GTE) 102, a peripheral device 103, a main memory 104, an Operating System ROM (OS-ROM) 105, a motion decoder (MDEC) 106, a communication interface 107, a graphics processing unit (GPU) 109, a frame buffer 110, a sound processing unit (SPU) 111, a sound buffer 112, a CD-ROM drive 113, a CD-ROM decoder 114, a CD-ROM buffer 115, and a peripheral interface 116.

A bus 117 mutually connects CPU 101, the peripheral device 103, the main memory 104, OS-ROM 105, MDEC 106, the communication interface 107, GPU 109, SPU 111, CD-ROM decoder 114, and the peripheral inte face 116.

CPU 101 is a microprocessor which controls various parts of the game apparatus main body 152, based on an operating system (OS) stored in OS-ROM 105, and on a program and data as read from CD-ROM 154 and expanded to the main memory 104, etc.

Concretely, CPU 101 reads the game program and three-dimensional modeling data, etc. from CD-ROM 154 and transfers them to the main memory 104. Moreover, CPU 101 reads a color look-up table and texture pattern data, etc. from CD-ROM 154, transfers them to the frame buffer 110, and requests GPU 109 to draw an image.

CPU 101 includes an interrupt register (not shown) to control permission and a priority level, etc. to an interrupt. The interrupt may be a vertical synchronization interrupt in the video signal supplied to the monitor display 156 or an interrupt by a user's operational input. Setting or resetting a flag located at a predetermined location of this register enables an interrupt processing routine to be executed which is associated beforehand with a specific interrupt or event by an interrupt vector.

GTE 102 is connected to CPU 101, and operates as a coprocessor of CPU 101. According to an operation request issued by CPU 101, GTE 102 executes computation on matrixes or vectors both of fixed-point representation. The computation includes, for example, coordinate calculation for movement, rotation, magnification, or reduction of three-dimensional coordinate data which constitute a three-dimensional model. The calculation further includes calculation for perspective projection transformation with respect to two-dimensional coordinate data, and brilliance calculation for various parts of the three-dimensional model. The brilliance calculation is executed, based upon a kind of a virtual light source, distance and an angle from the light source, and a location of a point called a viewpoint or an eye point.

The peripheral device 103 executes interrupt control and control concerning DMA (Direct Memory Access) transfer. An OS which executes basic control of the game apparatus main body 152, such as an OS kernel and a boot loader, is stored in the OS-ROM 105.

MDEC 106 executes expansion processing of compressed images. Concretely, decoding processing of Huffman codes, inverse quantization, inversed discrete cosine translation (IDCT), etc. are executed on the compressed image data of either static images compressed according to the JPEG (Joint Photographic Coding Experts Group) method or moving picture images compressed according to the MPEG (Moving Picture Expert Group) method, etc. and the compressed image data is expanded.

The communication interface 107 comprises a modem and a LAN card (neither shown), etc. and transfers a program and image data, etc. by exchanging information by a telecommunication line 120 with a device (not shown) provided on a network 121.

GPU 109 is an image processing dedicated processor which operates independently of CPU 101. GPU 109 executes modeling processing and rendering processing, etc. to a three-dimensional model composed of multiple polygons. GPU 109 executes the processing according to drawing instructions issued by CPU 101, based on coordinate data and color information obtained by GTE 102 and based on the color look-up table and the texture pattern data expanded in the frame buffer 110. A polygon is a plane that is the minimum unit of elements composing surfaces of three-dimensional models (objects) such as a character (a moving object) or other object placed in a virtual three-dimensional space of the game. Examples of polygons include triangles and rectangles.

Concretely, three-dimensional models are placed in the three-dimensional virtual space. Hidden surface processing is executed based on a Z-sort algorithm to a two-dimensional projected image of each three-dimensional model, and then the two-dimensional projected image is drawn in the frame buffer 110. The texture mapping is executed to map a texture pattern to the polygon drawn in the frame buffer 110, based on the texture pattern data stored in the texture area of the frame buffer 110.

GPU 109 generates an interlaced video signal of 60 Hz, etc. by adding a synchronization signal to the image data drawn in the frame buffer 110 or to the image data transferred from the main memory 104, and supplies the video signal to the monitor display 156.

The frame buffer 110 is composed of a dual-port RAM (not shown), and includes a drawing area, a display area and a texture area. The drawing area stores image data drawn by GPU 109 or image data transferred from the main memory 104. The display area stores image data to be displayed on the monitor display 156. The drawing area and the display area are alternately switched by GPU 109 according to the field rate for video display. The texture area stores both the color look-up table referred to for designation of a color and the texture pattern data.

SPU 111 is a sound processing dedicated processor which operates independently of CPU 101. SPU 111 appropriately executes modulation processing to sound data stored in the sound buffer 112 according to sound reproducing instructions issued by CPU 101. In addition, SPU 111 executes reproducing processing to the sound data, and outputs a voice signal to the monitor display 156.

CD-ROM drive 113 executes drive control of CD-ROM 154, and reads encoded data stored in CD-ROM 154. CD-ROM decoder 114 decodes a program and data which CD-ROM drive 113 reads from CD-ROM 154. CD-ROM decoder 114 further executes error correcting processing to the program and the data, etc. and transfers the program and the data as decoded to the main memory 104 and SPU 111, etc. CD-ROM drive 113 further includes an internal sound source and a mixer (neither shown) and functions to reproduce audio data. The CD-ROM buffer 115 is a memory for temporarily storing data to be transferred.

The controller 153 and the memory card 155 are connected to the peripheral interface 116. The peripheral interface 116 controls data transferring between either of the controller 153 and the memory card 155 and various parts of the game apparatus main body 152, for instance, CPU 101 or the main memory 104.

The controller 153 is an input device which transfers various operation signals corresponding to operational inputs supplied by an operator, to the game apparatus main body 152 through the peripheral interface 116.

The memory card 155 is a detachable external memory including a flush memory, and is used to temporarily store game data.

The main memory 104 comprises a DRAM of 16 Mbytes, and provides a work area to store a program and data loaded from CD-ROM 154 or temporarily to store data generated during the progress of a game.

Figure 2:
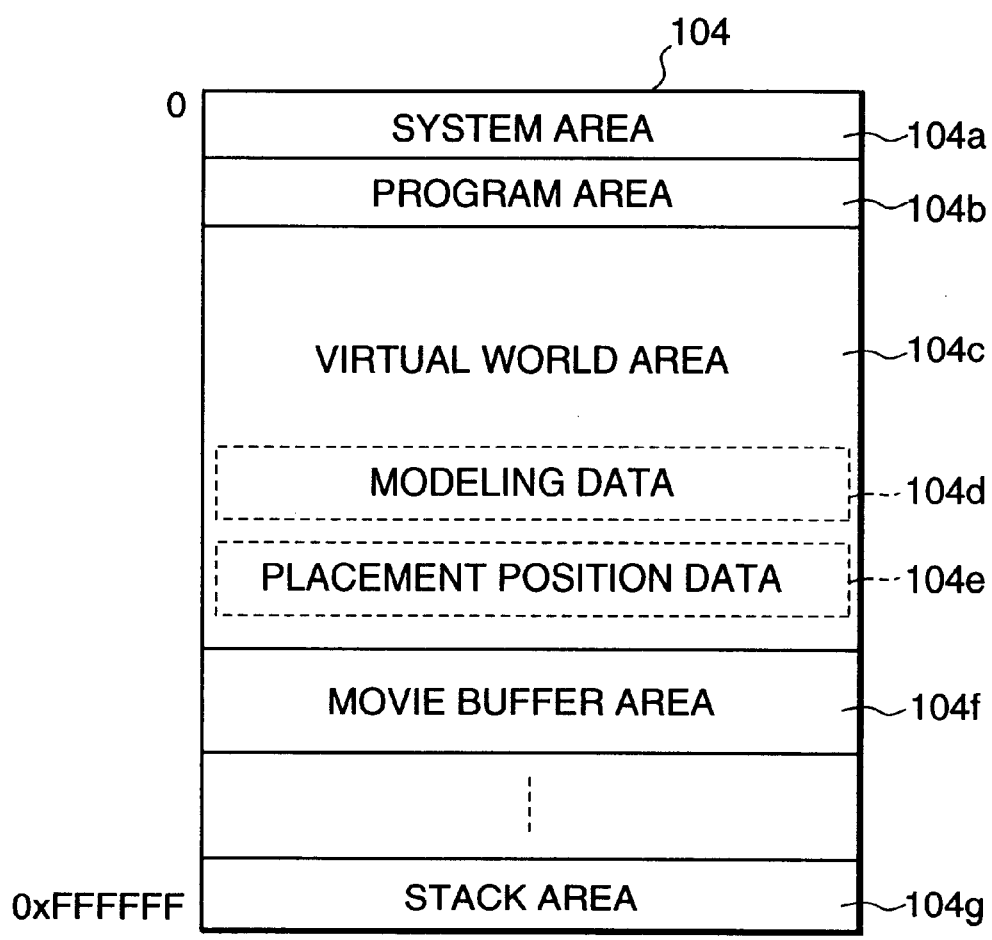
FIG. 2 shows a memory map of a main memory of the game apparatus.

FIG. 2 shows a memory map of the main memory 104. The main memory 104 includes a system area 104a, a program area 104b, a virtual world area 104c, a movie buffer area 104f and a stack area 104g. The system area 104a stores system information such as an interrupt vector which specifies a jump target address for an interrupt processing routine. The program area 104b stores a game program which includes a series of instructions for game processing and a series of drawing instructions for drawing images in the screen of the monitor display 156. The virtual world area 104c stores modeling data 104d for each object constituting a world (virtual world) in the game constructed in a three-dimensional virtual space and placement position data 104e indicative of placement positions of the objects in the three-dimensional virtual space. The movie buffer area 104f is used as a work area for loading from CD-ROM 154 movie data indicative of a movie to be mapped as a texture and as a work area for expanding the movie data by MDEC 106. The stack area 104g stores local variables, etc. as used in a course of execution of the program.

[Functional Configuration]

FIG. 3 is a functional block diagram of the game apparatus 100, and represents configuration of functions of the game apparatus 100 when the game apparatus 100 executes display processing for moving picture images.

The game apparatus 100 mainly includes a storing unit and a processing unit. The storing unit includes a graphics/image data storing unit 201, a virtual world storing unit 202, a display image data buffer unit 203, a texture data buffer unit 204, and an image data buffer unit 205. The processing unit includes an object placing unit 210, an object moving unit 211, a texture mapping unit 212, a perspective projection transformation unit 213, an image data transferring unit 214, an image data reading unit 215, a video signal generating unit 216, a control unit 217 and a viewpoint moving unit 218.

The graphics/image data storing unit 201 is mainly realized by CD-ROM 154. The virtual world storing unit 202 and the image data buffer unit 205 are mainly realized by the virtual world area 104c and the movie buffer area 104f of the main memory 104. The display image data buffer unit 203 and the texture data buffer unit 204 are mainly realized by the frame buffer 110.

The control unit 217 is mainly realized by CPU 101, OS-ROM 105 and the program stored in CD-ROM 154. The object placing unit 210 is mainly realized by CPU 101 and GTE 102. The texture mapping unit 212 and the video signal generating unit 216 are mainly realized by GPU 109. The perspective projection transformation unit 213 is mainly realized by CPU 101, GTE 102, the peripheral device 103 and GPU 109. The image data transferring unit 214 is mainly realized by CPU 101 and the peripheral device 103. The image data reading unit 215 is mainly realized by CPU 101, CD-ROM drive 113, CD-ROM decoder 114 and MDEC 106.

The graphics/image data storing unit 201 stores graphics/image data such as modeling data and image data, for objects which are targets of graphic processing executed by the game apparatus 100. Concretely, the graphics/image data storing unit 201 stores three-dimensional (3D) graphics data 201a, two-dimensional (2D) image data 201b, and 2D movie data 201c, etc.

The 3D graphics data 201a defines shapes of three-dimensional objects to be displayed such as a character object or background objects. These objects are components of the virtual world. Each object is represented by a group of polygons constituting its surface, like a rectangle or a triangle. The vertices of each polygon of an object is specifiedby their coordinates according to a coordinate system (local coordinate system) proper to the object. The 3D graphics data 201a stores the coordinates of the vertices of polygons which constitute the object, and texture address data, etc. The texture address data respectively designates texture data which should be mapped to the object.

Each texture address data is a storage address of the texture data buffer unit 204, specifying a texture which should be mapped to a polygon. The texture address data is represented as TRn (U, V), for example. The symbol TRn designates a specific texture area TRn in the texture data buffer unit 204. The symbol (U, V) designates a coordinate of a picture element in the texture area TRn, corresponding to a specific point in the polygon (for instance, the upper left vertex of a rectangular polygon).

The 2D image data 201b is, for example, image data representing a two-dimensional object such as a background object placed in the three-dimensional virtual space, or texture data to be mapped to a surface (polygon) of an object.

The movie data 201c is image data comprising two-dimensional image data (frame images) respectively representing different parts of continuous movement of an object, as obtained by dividing the continuous movement by a frame period (a period of a vertical synchronizing signal, for example, 1/60 second according to the NTSC color television system). In the present embodiment, the movie data 201c is used so as to be sequentially mapped to a specific polygon as texture data. Actually, the movie data 201c is mapped to a specific polygon, but occasionally it is referred to in the present specification that a movie is mapped to the polygon or a movie represented by the movie data is mapped to the polygon.

The virtual world storing unit 202 is a temporary storage area for storing all parts that constitute the virtual world constructed in the three-dimensional virtual space. The virtual world storing unit 202 stores the placement positions of all objects placed in the three-dimensional virtual space, as expressed in terms of coordinates of a common coordinate system (world coordinate system), and modeling data of respective objects as expressed in terms of coordinates of the local coordinate system.

The object placing unit 210 constructs the virtual world by placing various objects in the three-dimensional virtual space, based on an instruction issued by the control unit 217. Concretely, the 3D graphics data 201a or the 2D image data 201b corresponding to an object specified by the control unit 217 is read from the graphics/image data storing unit 201, and is stored in the virtual world storing unit 202 together with coordinates of a placement position specified by the control unit 217.

The control unit 217 executes game processing, and controls the processing units 210 to 216 and 218, based on a game processing routine or drawing instructions, etc. as included in a game program downloaded into the main memory 104 from CD-ROM 154. Concretely, the control unit 217 develops the game through interactions with a player, and informs the object placing unit 210 of an object to be placed in the three-dimensional virtual space and its placement position. The control unit 217 informs the object moving unit 211 of an object to be moved and its moving features (its move vector and its speed, etc.). The control unit 217 informs the texture mapping unit 212 of a polygon to be processed. The control unit 217 informs the perspective projection transformation unit 213 of information specifying the position of a viewpoint and a screen (projection plane). The control unit 217 informs the image data reading unit 215 and the image data transferring unit 214 of a number (frame number) for specifying a frame image within the movie data 201c, to be read or to be transferred, etc. The control unit 217 supplies a synchronization signal to the video signal generating unit 216. The control unit 217 informs the viewpoint moving unit 218 of a position of the viewpoint or movement of the viewpoint.

The object moving unit 211 moves an object placed in the three-dimensional virtual space based on an instruction issued by the control unit 217. That is, it rotates or translates polygons constituting the object. Concretely, it reads a placement position as stored in the virtual world storing unit 202, of an object as instructed by the control unit 217, and calculates a new placement position of the object. It repeats such movement of the object at a regular time interval.

The texture mapping unit 212 executes rendering processing, based on instructions issued by the control unit 217. In this processing, the texture address data designated for each polygon stored in the virtual world storing unit 202 is referred to and a texture is mapped to a polygon.

Figure 4A:
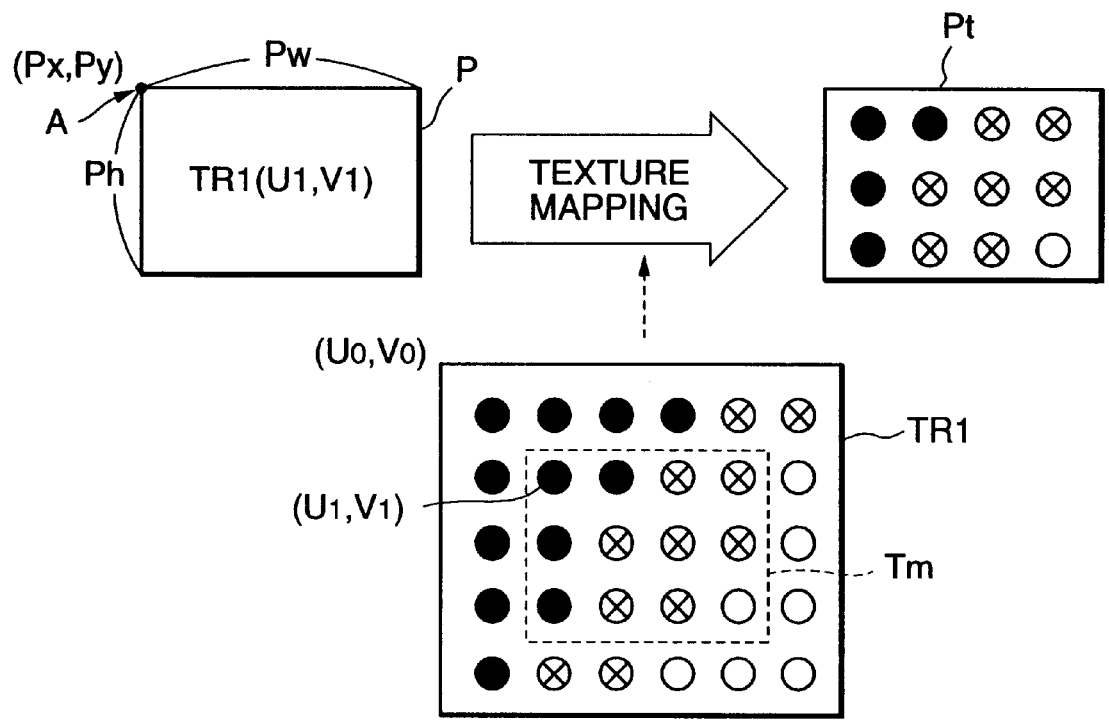
FIG. 4A shows a relation between a polygon and texture data, for explaining the function of the texture mapping unit of the game apparatus.

For instance, as shown in FIG. 4A, it is assumed that the coordinates of the vertex A at the upper left corner of the rectangular polygon P is (Px, Py), the height and the width of the polygon are Ph and Pw, respectively, and the texture address data TRI (U1, V1) is designated for the polygon P. The texture mapping unit 212 reads from the texture area TR1 of the texture data buffer unit 204, texture data belonging to a rectangular area Tm having an upper left vertex of the coordinates (U1, V1) with width Pw and height Ph. The texture mapping unit 212 writes the texture data into a corresponding area in the display image data buffer unit 203, in such a manner that an internal area of the polygon P is filled up. As a result, a polygon Pt with the mapped texture data is obtained.

Figure 4B:
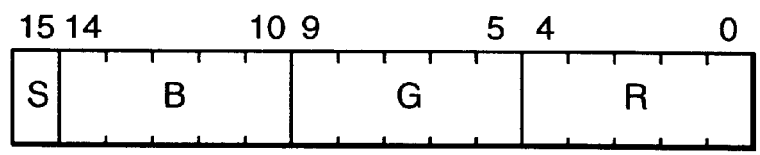
FIG. 4B shows a format of a picture element data of the texture data.

As shown in FIG. 4B, data of a picture element constituting texture data comprises 16 bit data which includes a flag S of 1 bit for designating translucency, and R, G and B data each of 5 bits. In case a color look-up table is designated for the texture data, the texture data is not mapped to a polygon as it is, but is mapped to the polygon after the color of the texture data is converted into a color specified by the color look-up table.

The texture mapping unit 212 can execute similar texture mapping to display image data of a polygon which has already been expanded in the display image data buffer unit 203, based on an instruction issued by the control unit 217, in addition to the above-explained mapping of texture data to a polygon stored in the virtual world storing unit 202. This type of texture mapping is executed when only texture data to be mapped to a polygon is changed, while keeping the polygon unchanged.

The viewpoint moving unit 218 places a viewpoint in the three-dimensional virtual space or moves it, based on instructions issued by the control unit 217. Objects displayed on a display screen among the objects placed in the three-dimensional virtual space are decided, depending on information such as the coordinates (or position) of the viewpoint.

Figure 5:
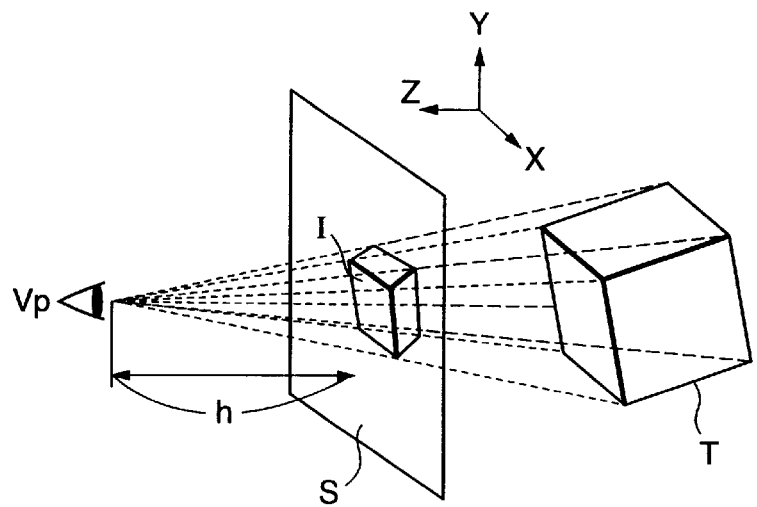
FIG. 5 explains the function of a perspective projection transformation unit of the game apparatus.

The perspective projection transformation unit 213 executes perspective projection transformation and hidden surface processing, based on instructions issued by the control unit 217, and generates a two-dimensional image obtained when the three-dimensional virtual world constructed in the virtual world storing unit 202 is viewed from a specific viewpoint VP. As shown in FIG. 5, the perspective projection transformation unit 213 calculates a two-dimensional image I projected on the screen S when the object T placed in the three-dimensional virtual space having the coordinate axes X, Y, and Z is viewed from the viewpoint VP. The calculation is based on the position of the viewpoint VP and the distance h between the viewpoint VP and the screen S. Concretely, the perspective projection transformation unit 213 translates the coordinates of vertices of the object T from the local coordinate system into the screen coordinate system through the world coordinate system.

The perspective projection transformation unit 213 executes hidden surface elimination based on a Z-sort algorithm, after the perspective projection transformation. That is, it sorts polygons to be displayed in decreasing order of distance from the viewpoint VP along the direction of the depth, and sequentially draws the polygons from the furthest polygon in an overlapping manner.

The display image data buffer unit 203 is a temporary storage area for storing display image data adapted for screen display by the monitor display 156. It comprises an odd-number-frame area 203a and an even-number-frame area 203b respectively for storing an image of an odd-number frame (actually, this is a field in the present embodiment, but a field is referred to as a frame) and an image of an even-number frame (field), in interlaced display.

The texture data buffer unit 204 is a temporary storage area for storing texture data to be mapped to polygons stored in the virtual world storing unit 202. Here, a number (m) of different texture areas TR1 to TRm are provided.

Both the display image data buffer unit 203 and the texture data buffer unit 204 comprise a dual-port memory. Writing and reading operations to each of those buffer units can be executed independently and simultaneously. Each buffer unit is accessed by a double-buffering method. For instance, the image data transferring unit 214 executes a write operation to the texture area TR1, while the texture mapping unit 212 executes a read operation to the texture area TR2 in parallel. On the contrary, the image data transferring unit 214 executes a write operation to the texture area TR2, while the texture mapping unit 212 executes a read operation to the texture area TR1, in parallel. Thus, disturbance, which may occur if writing and reading operations are simultaneously executed to the same area, of a screen image is avoided.

Based on instructions issued by the control unit 217, the image data reading unit 215 reads image data (the 2D image data 201b or the movie data 201c) to be used as a texture to be mapped, from the graphics/image data storing unit 201, that is, from CD-ROM 154, expands the image data, and then stores the expanded image data into the image data buffer unit 205. As for the movie data 201c, a series of frame images which have a series of frame numbers as designated and equal in number to a designated number can be read out.

The image data buffer unit 205 is a temporary storage area for storing image data read by the image data reading unit 215.

The image data transferring unit 214 transfers the image data read out to the image data buffer unit 205 to the area TR1 to TRm in the texture data buffer unit 204 by a DMA transfer method, based on an instruction issued by the control unit 217.

In the present embodiment, the image data transferring unit 214 sequentially stores frame images constituting the movie data 201c into a number (m) of texture areas TR1 to TRm, by sequentially switching those areas with every frame image in units of $1/60$ second.

The video signal generating unit 216 sequentially reads a plurality of display image data from the odd number frame area 203a and the even number frame area 203b by alternately switching those areas every $1/60$ second, executes D/A conversion to that display image data, and adds a synchronization signal to each of them. Thus, it generates a video signal corresponding to a screen mode by interlacing and outputs the signal to the monitor display 156.

[Operations]

Next, will be explained operations of the game apparatus 100 at execution of display processing of moving picture images.

Figure 6:
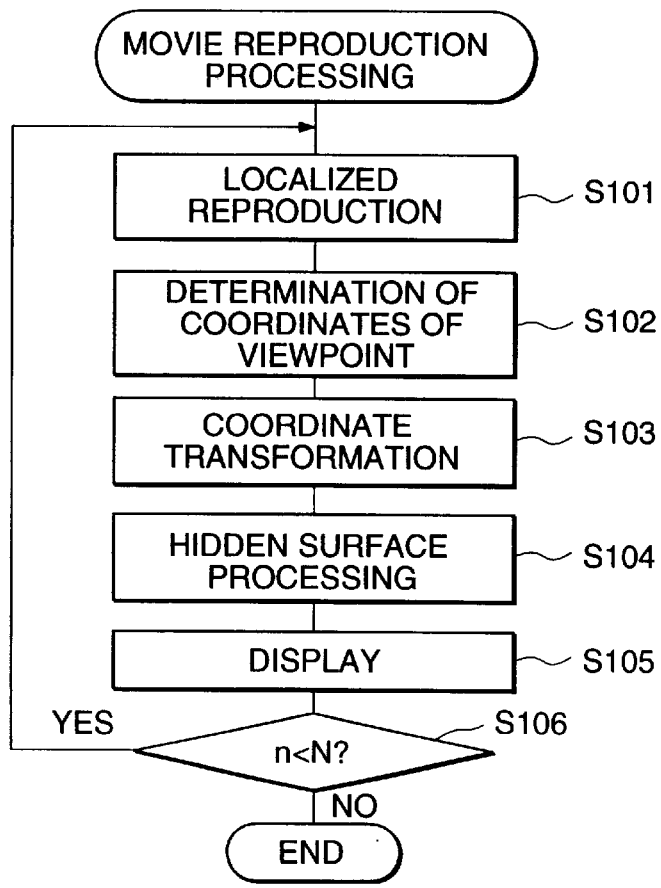
FIG. 6 is a flowchart of movie reproduction processing executed by the game apparatus.

FIG. 6 is a flowchart of movie (that is, a moving picture) reproductionprocessingof the game apparatus 100.

In this processing, movie data is mapped as texture data to a specific polygon placed in the three-dimensional virtual space, thereby reproducing a movie only on a limited area, the polygon, and not on the entire screen. Hereinafter, such reproduction may be referred to as localized reproduction of a movie.

The game apparatus 100 repeats the following processing (steps S101 to S106) every period of the vertical synchronizing signal of the video signal provided to themonitor display 156, for instance, every $1/60$ second. However, the contents of processing S101 to S106 differ a little, depending upon whether an image of an odd number frame is drawn or whether an image of an even number frame is drawn, as will be explained later on.

First, the control unit 217 executes localized-reproduction processing (step S101). In the localized-reproduction processing, frame images constituting movie data are sequentially read in, and in parallel to the reading operation, respective frame images as read are sequentially mapped as a texture to a specific polygon placed in the three-dimensional virtual space.

Next, the control unit 217 requests the object placing unit 210, the object moving unit 211 and the texture mapping unit 212, etc. to execute processing for forming a display screen image of the monitor display 156 (construction and change of the virtual world). The processing includes processing of placing objects such as background objects, a character object, and other objects in the three-dimensional virtual space, processing of moving the character object, and processing of mapping texture data to polygons of those objects. Then, the coordinates of the viewpoint are decided (step S102). The viewpoint is used to execute perspective projection transformation to the virtual world.

The control unit 217 notifies the perspective projection transformation unit 213 of the decided viewpoint coordinates, and requests transformation of the coordinates of the modeling data of each of the objects placed in the three-dimensional virtual space, from a local coordinate system to the screen coordinate system through the world coordinate system (step S103).

The perspective projection transformation unit 213 executes hidden surface processing to each of the polygons obtained by the perspective projection transformation, based on the Z-sort algorithm, and draws a frame image to be displayed on a display screen, into the display image data buffer unit 203 (the odd number frame area 203a or the even number frame area 203b) (step S104).

Finally, the video signal generating unit 216 scans and reads the frame image stored in the odd number frame area 203a (or, the even number frame area 203b), converts the frame image into a video signal, and outputs the video signal to the monitor display 156 (step S105).

Next, the control unit 217 judges whether all of the movie data has been displayed (step S106). Concretely, it is judged whether the frame number n indicative of a frame number of a frame of a current processing target has reached the total number N of frames of the movie data. Details of the judging processing will be explained later on. When the frame number n has reached the total number N (step S106, "No"), the movie reproduction processing ends, and the processing moves to the next game processing.

When the frame number n has not reached the total number N (step S106, "Yes"), the control unit 217 returns to step S101, and repeats the same procedure (step S101 to S106), to progress reproduction of the movie data.

Figure 7:
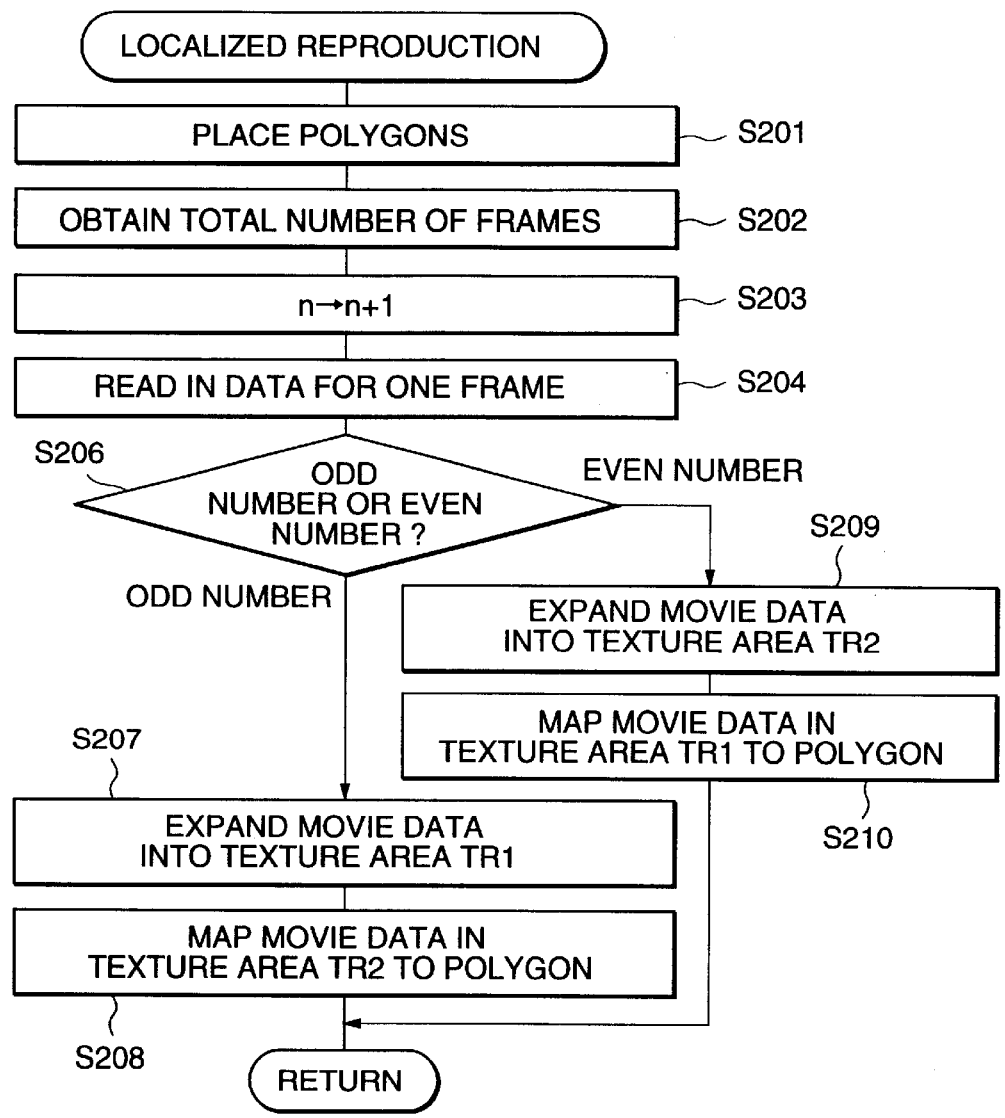
FIG. 7 is a flowchart of an exemplary detailed procedure of the localized-reproduction processing shown in FIG. 6.

FIG. 7 is a flowchart of a detailed procedure of the localized-reproduction processing of step S101, shown in FIG. 6. Here, it is presumed that the movie data 201c stored in the graphics/image data storing unit 201 is used.

First, the control unit 217 places a polygon to which the movie data should be mapped as a texture, in the three-dimensional virtual space, based on designation by a drawing instruction (step S201). When the polygon has already been placed in the three-dimensional virtual space, the polygon may be specified as one to which the movie data should be mapped, among polygons whose placement positions are already stored in the virtual world storing unit 202.

Next, the control unit 217 acquires the total number N of frames constituting the movie data 201c to be used as a texture, and the texture address data of the polygon, based on designation by the drawing instruction (step S202).

The control unit 217 increments the frame number n by one (step S203), and forwards the frame number n incremented to the image data reading unit 215, and causes the n-th frame image of the movie data 201c to be read out from the graphics/image data storing unit 201 and to be stored into the image data buffer unit 205 (step S204).

The control unit 217 judges whether the frame number n is an even number or an odd number (step S206).

When the frame number n is an odd number (step S206), the control unit 217 notifies that fact to the image data transferring unit 214, and causes the frame image already stored in the image data buffer unit 205 to be transferred to the texture area TR1 and to be expanded and stored therein (step S207). In parallel to the transfer of the image data, the control unit 217 further indicates the polygon specified in step S201 to the texture mapping unit 212, and causes the frame image already expanded in the texture area TR2 to be mapped to the polygon as a texture (step S208).

When the frame number n is an even number (step S206) the control unit 217 notifies that fact to the image data transferring unit 214, and causes the frame image already stored in the image data buffer unit 205 to be transferred to the texture area TR2 and to be expanded and stored therein (step S209). In parallel to the transfer of the image data, the control unit 217 further indicates the polygon specified in step S201 to the texture mapping unit 212, and causes the frame image already expanded in the texture area TR1 to be mapped to the polygon as a texture (step S210).

Then, the processing returns to step S102 (FIG. 6), the perspective projection processing is executed to the polygon which has had the frame image mapped, and the polygon is displayed on the display screen on the monitor display 156 (step S102 to S105), as already explained.

Thus, frame images constituting the movie data 201c are sequentially mapped to the same polygon, and the movie is reproduced on only part of the screen area (only the area where the polygon is displayed) of the monitor display 156. The buffer areas in the texture data buffer unit 204 are switched between exclusive writing and exclusive reading. So, occurrence of disturbance of a displayed image is avoided which may occur if writing and reading operations are simultaneously executed to the same buffer area.

Next, will be shown concrete examples of displaying moving pictures by the game apparatus 100.

[First Example]

The first example is an example of displaying a moving picture by mapping movie data as texture data to a stationary polygon placed in the three-dimensional virtual space. To be more specific, in an example shown below, an aspect is effectively produced where an enemy character scatters smoke to an own character, where the own character is a leading character manipulated by a player, and the enemy character is a fighting opponent of the own character.

Figure 8:
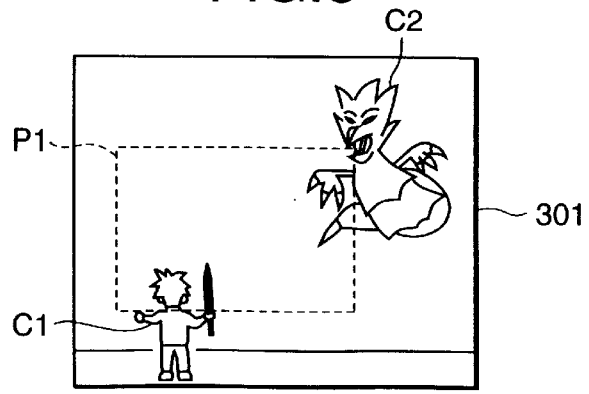
FIG. 8 depicts a display screen showing a scene of a game immediately before localized reproduction of a movie is started, in accordance with a first example.
Figure 9A:
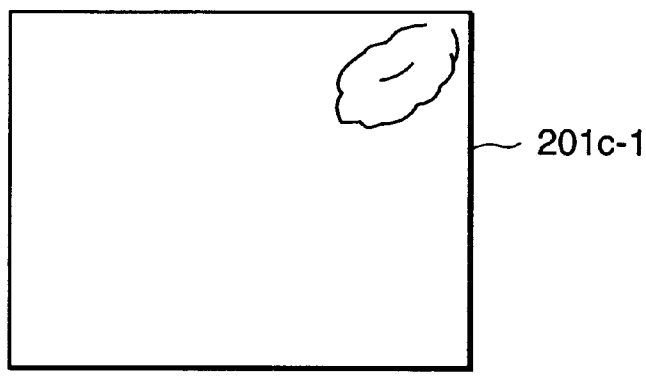
FIG. 9A depicts a leading frame image of four exemplary frame images of movie data used as a texture, in accordance with the first example.
Figure 9B:
FIG. 9B depicts a succeeding second one of the four exemplary frame images.
Figure 9C:
FIG. 9C depicts a further succeeding third one of the four exemplary frame images.
Figure 9D:
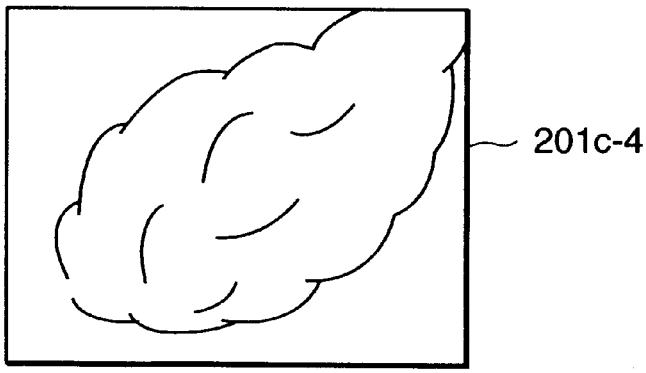
FIG. 9D depicts a still further succeeding fourth one of the four exemplary frame images.
Figure 10A:
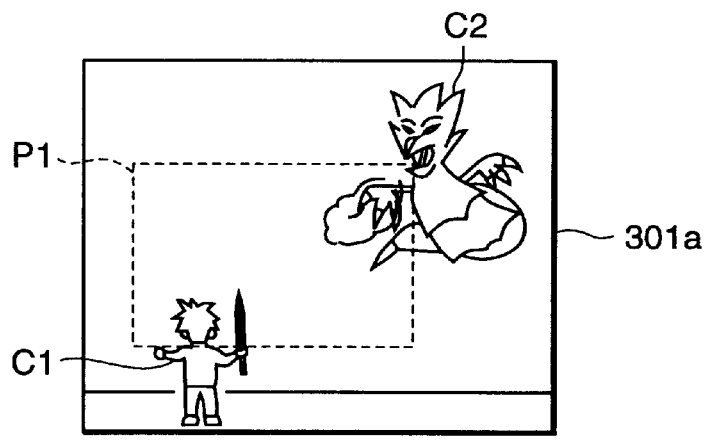
FIG. 10A depicts a leading display screen image of four exemplary display screen images which are sequentially displayed when localized reproduction of the movie is executed, in accordance with the first example.
Figure 10B:
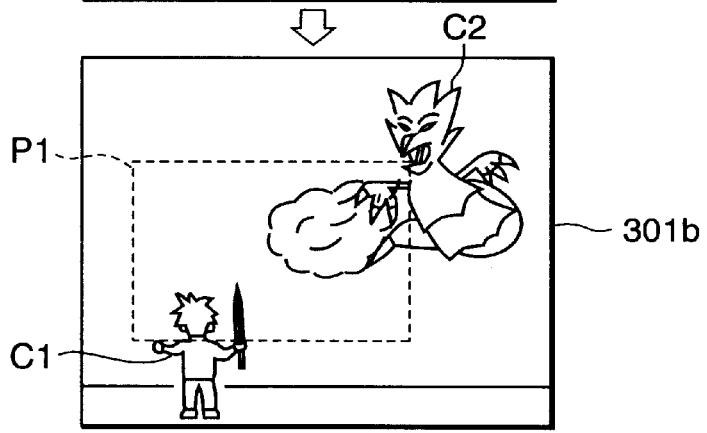
FIG. 10B depicts a succeeding second one of the four exemplary display screen images.
Figure 10C:
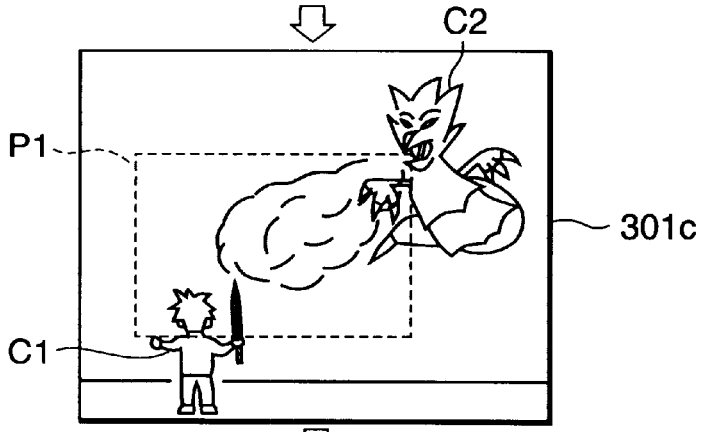
FIG. 10C depicts a further succeeding third one of the four exemplary display screen images.
Figure 10D:
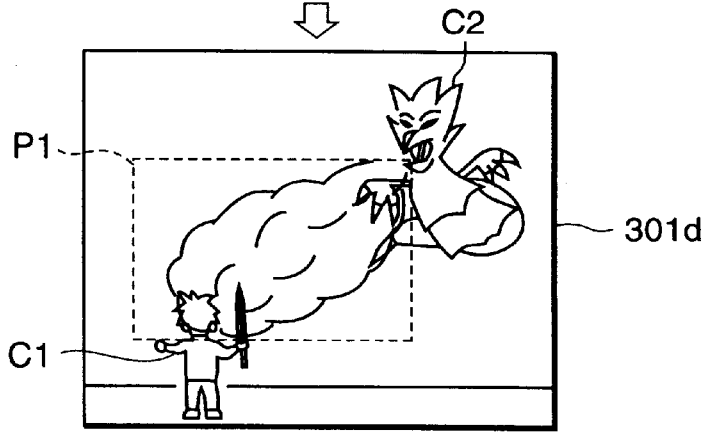
FIG. 10D depicts a still further succeeding fourth one of the four exemplary display screen images.

FIG. 8 shows a display screen 301 of the monitor display 156 which shows a scene of a game at the start of localized reproduction of movie. The own character C1 is located at a lower position in the screen and the enemy character C2 is located to the upper right of the own character C1. The rectangular polygon P1 covering the own character and having an upper right vertex at the position of the mouth of the enemy character C2 is placed at the nearest position in the display screen 301.

Concretely, modeling data and placement position data representing each of the own character C1, the enemy character C2, and the polygon P1 shown in the figure are stored in the virtual world storing unit 202. The texture address data stored for the polygon P1 designates the texture area TR1 and TR2.

FIGS. 9A to 9D depict four exemplary frame images 201C-1 to 201C-4 of the movie data 201c used as a texture in the first example. The leading frame image 201C-1 depicts an initial state where smoke has been emitted from the upper right position of the screen toward the lower left position in the screen. The succeeding second frame image 201C-2 depicts an intermediate state where smoke has more spread. The further succeeding third frame image 201C-3 depicts an advanced state where the front end of the smoke has nearly reached the middle of the frame image. The still further succeeding fourth frame image 201C-d depicts a further advanced state where the front end of the smoke has nearly reached the bottom of the frame image. The movie data 201c represents a moving picture showing smoke emitted from the upper right position in the screen to the lower left position in the screen. The movie data 201c comprises 240 frame images in total. Four typical frame images 201C-1 to 201C-4 are shownwithin the 240 frame images. Concretely, the movie data 201c with color information of translucent color which represents smoke of a form which changes as shown in this figure is stored in the graphics/image data storing unit 201.

FIGS. 10A to 10D depict four exemplary display screen images 301a to 301d which are sequentially displayed when localized reproduction of the movie is executed in the first example. The leading display screen image 301a depicts an initial state where the enemy character C2 has just emitted smoke aiming at the own character C1 from the upper right position of the screen toward the lower left position in the screen. The succeeding second display screen image 301b depicts an intermediate state where smoke has more spread. The further succeeding third display screen frame image 301c depicts an advanced state where the front end of the smoke has almost reached the own character C1. The still further succeeding fourth display screen image 301d depicts a further advanced state where the smoke is attacking the own character C1. An aspect where the enemy character C2 emits smoke aiming at the own character C1 is realistically shown. Because the smoke of translucent color is mapped to the polygon P1 placed nearer in the screen than the own character C1, the own character C1 and the background, etc. located deeper in the screen show through.

Concrete contents of such processing are as follows. According to the flow shown in FIG. 7, the first frame image of the movie data 201c representing a smoke effect is stored in the texture area TR1 by the image data transferring unit 214 in the first 1/60 second. The second frame image is stored in the texture area TR2 in the next 1/60 second, and in parallel to the storing of the second frame image, the first frame image already stored in the texture area TR1 is written into the area of the polygon P1. The third frame image is stored in the texture area TR3 in the further next 1/60 second, and in parallel to the storing of the third frame image, the second frame image already stored in the texture area TR2 is written into the area of the polygon P1. Such processing is repeated 240 times. The display screen images 301a to 301d are ones respectively displaying the 60th, 120th, 180th and 240th frame images.

The perspective projection transformation unit 213 expands the 240 frame images sequentially mapped to the polygon P1 into the display image data buffer unit 203 as two-dimensional images, and then the video signal generating unit 216 displays the expanded two-dimensional images on the monitor display 156.

Thus, according to the first example, the frame images constituting the movie data are sequentially mapped to the same polygon, and texture areas for storing respective frame images are switched. In addition, the movie is of translucent color, and is mapped to the polygon placed at the nearest position in the screen. So, an aspect (moving picture) where the enemy character scatters smoke to the own character is easily and effectively produced.

[Second Example]

The second example is an example of displaying a moving picture by mapping movie data as texture data to stationary polygons placed in the three-dimensional virtual space, thereby displaying progress of the same moving picture at multiple positions in the screen. The second example differs from the first example in that movie data is mapped to multiple polygons and not to a single polygon. To be more specific, in an example shown below, an aspect is effectively produced where the same animation is displayed at each television monitor arranged on a shelf of an electric appliance shop.

Figure 11A:
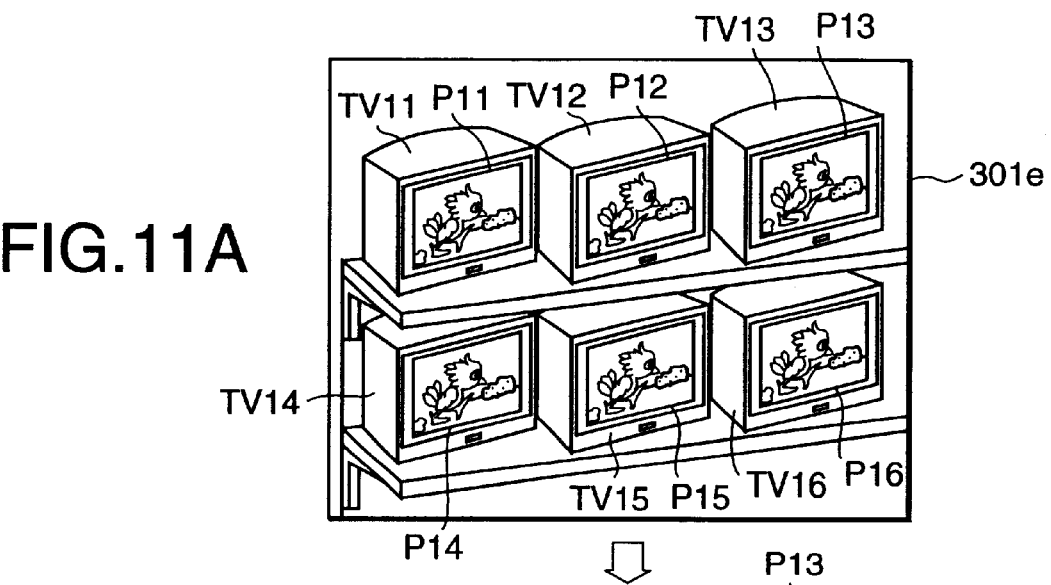
FIG. 11A depicts a leading display screen image of three exemplary display screen images which are sequentially displayed when localized reproduction of a movie is executed, in accordance with a second example.
Figure 11B:
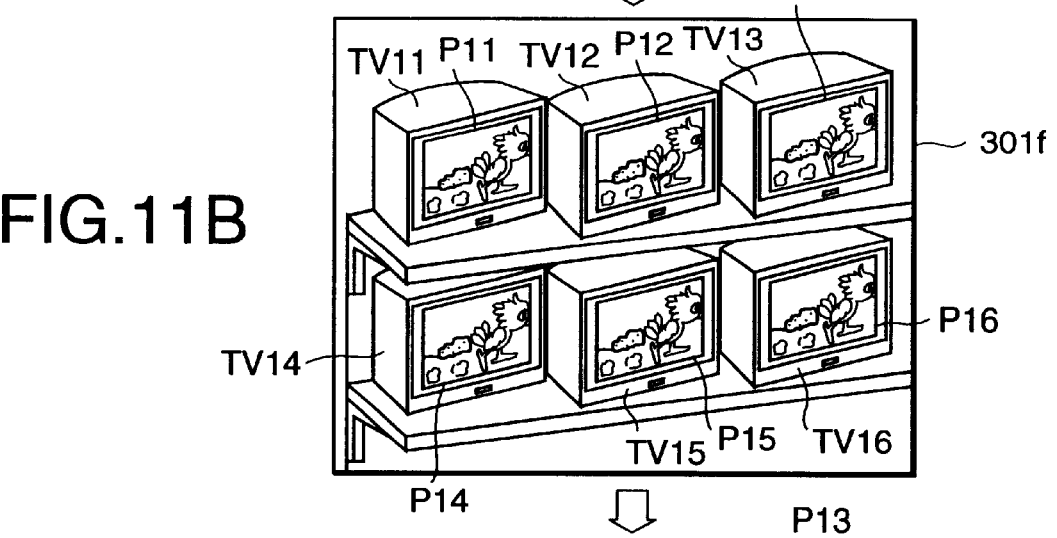
FIG. 11B depicts a succeeding second one of the three exemplary display screen images.
Figure 11C:
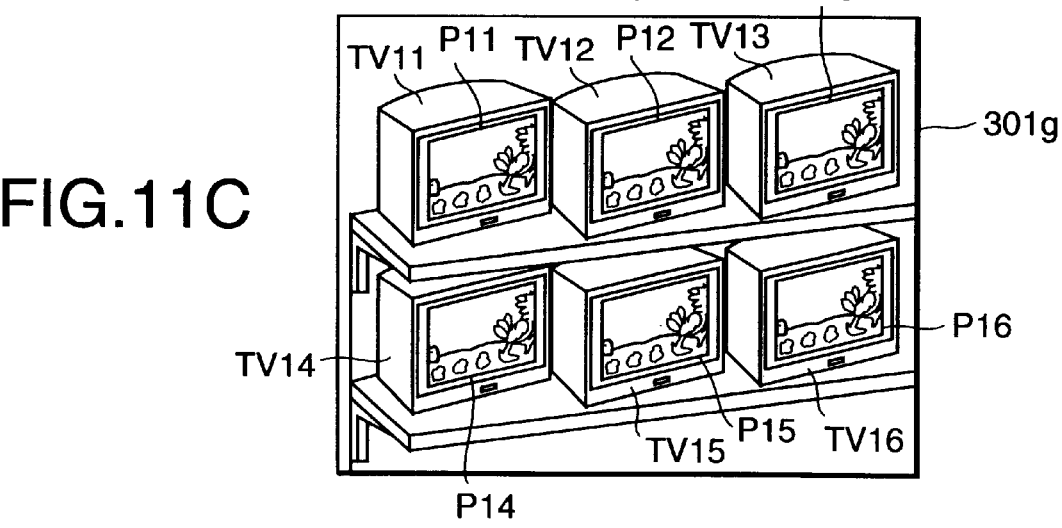
FIG. 11C depicts a further succeeding third one of the three exemplary display screen images.

FIGS. 11A to 11C depict three exemplary display screen images 301e to 301g which are sequentially displayed when localized reproduction of a movie is executed in the second example. The leading display screen image 301e depicts an initial state where a walking chicken is at the middle of each of the screens of six television monitors TV11 to TV16. The succeeding second display screen image 301f depicts an intermediate state where the chicken has walked near the right side of each of the screens of the six television monitors TV11 to TV16. The further succeeding third display screen frame image 301g depicts an advanced state where the chicken is passing through the right side of each of the screens of the six television monitors TV11 to TV16. The same animation is projected onto each screen of the six television monitors TV11 to TV16. Here, the target movie of localized reproduction is animation where one chicken walks from the left position in the screen to the right position in the screen. Target polygons to which the movie is mapped are polygons P11 to P16 representing the screens of the six television monitors TV11 to TV16.

The contents of processing of localized reproduction of the same movie to multiple places are basically the same as in the first example. What differs is that in the placement of the polygon (step S201), all six polygons P11 to P16 are placed (specified), and that in the texture mapping (step S208 and S210), one frame image expanded in the texture data buffer unit 204 (the texture area TR1 or TR2) is mapped to the six polygons P11 to P16 among polygons of which placement positions are already stored in the virtual world storing unit 202. That is, the polygons P11 to P16 are set so as to have the same texture address data.

According to the second example, the frame images constituting a single movie are mapped sequentially frame by frame to multiple polygons and each image data is mapped to the polygons at the same time, thereby easily showing an aspect where the moving picture progresses simultaneously at multiple positions on the screen.

[Third Example]

The third example is an example of moving a position of a viewpoint in addition to mapping movie data as texture data to a stationary polygon placed in the three-dimensional virtual space, thereby changing the display position of the moving picture on the screen. To be more specific, in an example shown below, an aspect is effectively produced where a baseball game is shown on a television monitor and the viewpoint for watching the monitor is moved.

Figure 12:
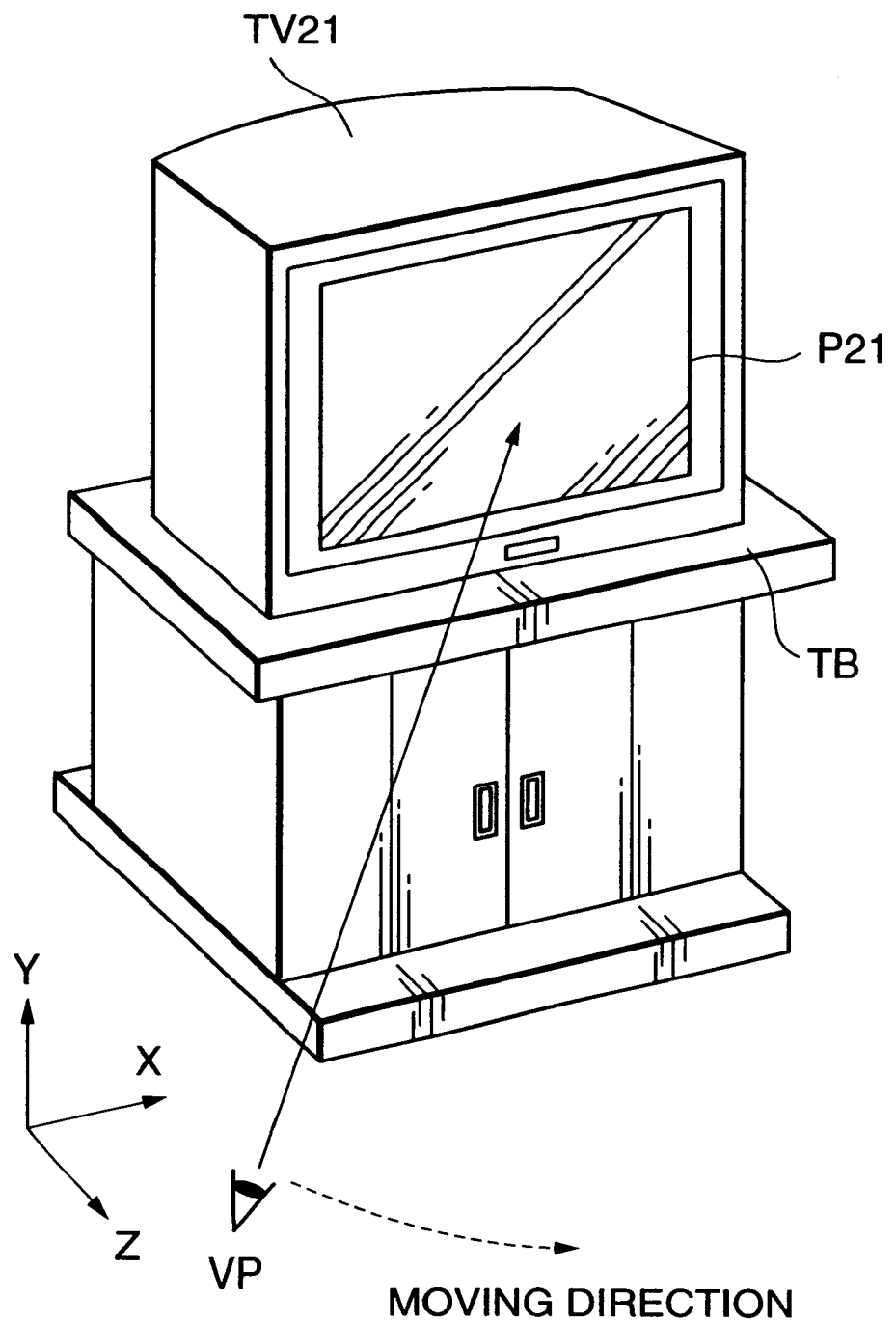
FIG. 12 depicts a virtual world and a viewpoint immediately before localized reproduction of a movie is started, in accordance with a third example.
Figure 13A:
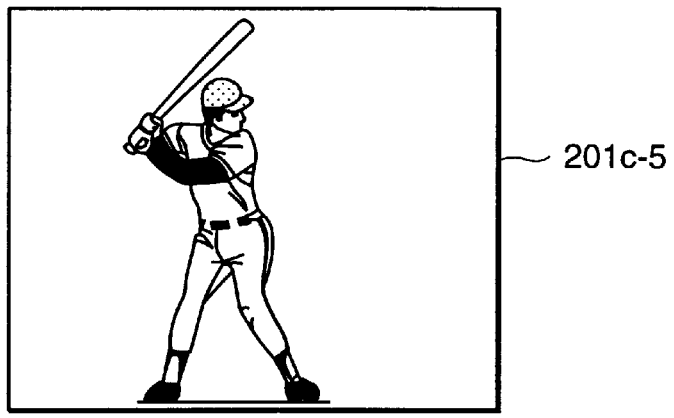
FIG. 13A depicts a leading frame image of four exemplary frame images of movie data used as a texture, in accordance with the third example.
Figure 13B:
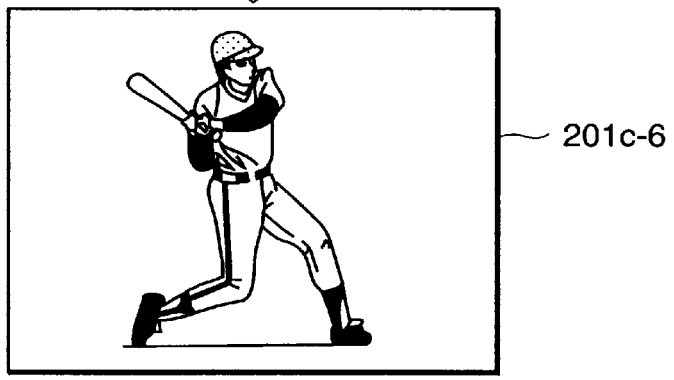
FIG. 13B depicts a succeeding second one of the four exemplary frame images.
Figure 13C:
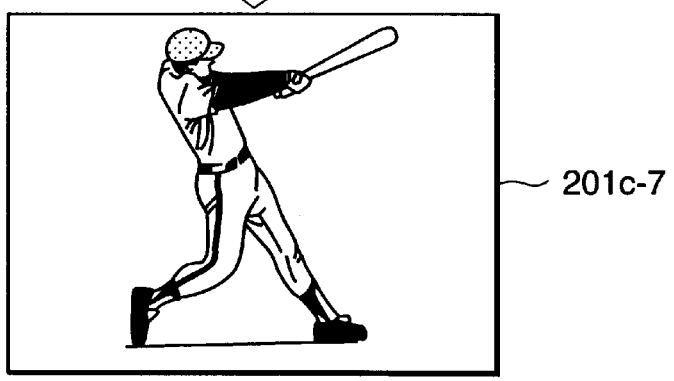
FIG. 13C depicts a further succeeding third one of the four exemplary frame images.
Figure 13D:
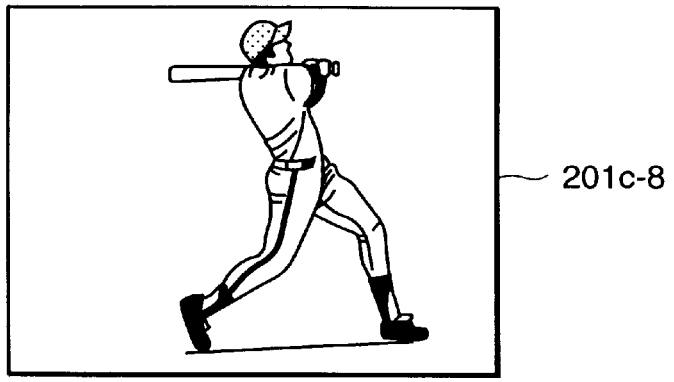
FIG. 13D depicts a still further succeeding fourth one of the four exemplary frame images.
Figure 14A:
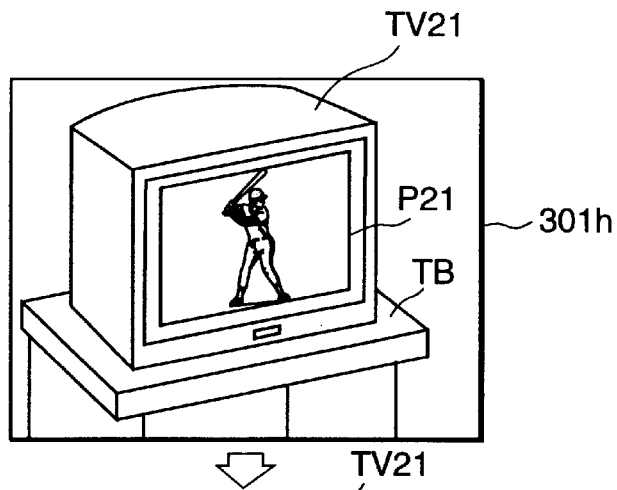
FIG. 14A depicts a leading display screen image of four exemplary display screen images which are sequentially displayed when localized reproduction of a movie and movement of a viewpoint are processed in parallel, in accordance with the third example.
Figure 14B:
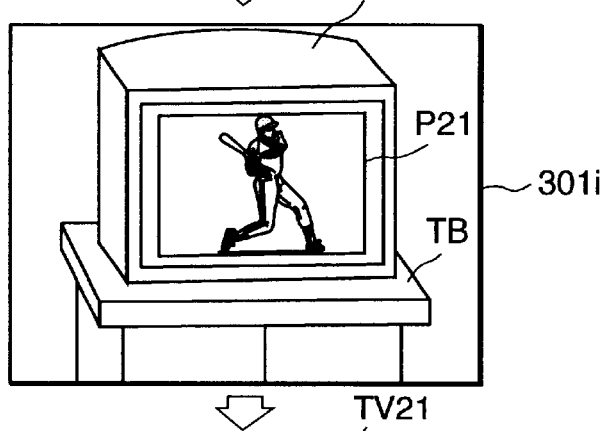
FIG. 14B depicts a succeeding second one of the four exemplary display screen images.
Figure 14C:
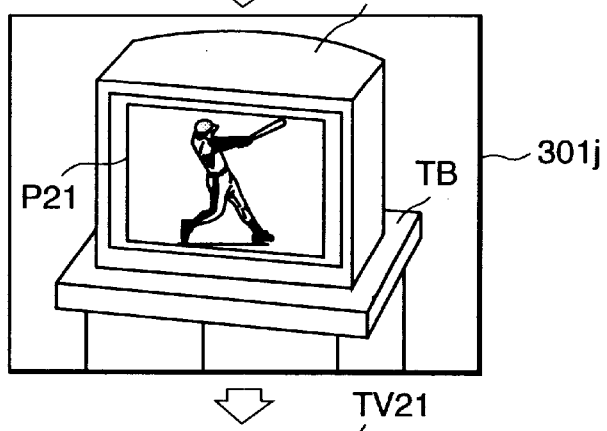
FIG. 14C depicts a further succeeding third one of the four exemplary display screen images.
Figure 14D:
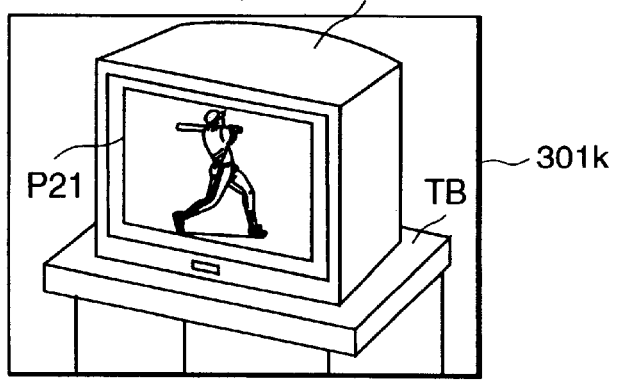
FIG. 14D depicts a still further succeeding fourth one of the four exemplary display screen images.
Figure 20A:
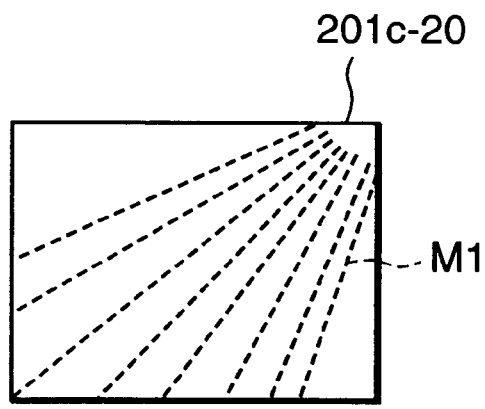
FIG. 20A depicts a leading frame image of four exemplary frame images of the movie data A1 to A300 shown in FIG. 19.
Figure 20B:
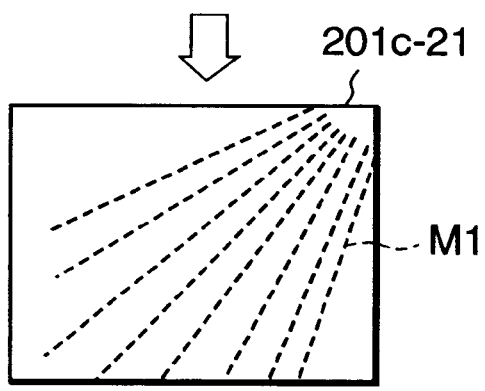
FIG. 20B depicts a succeeding second one of the four exemplary frame images.
Figure 20C:
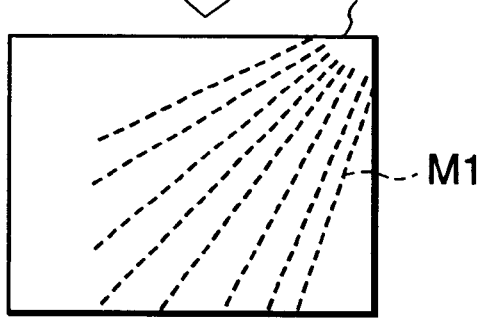
FIG. 20C depicts a further succeeding third one of the four exemplary frame images.
Figure 20D:
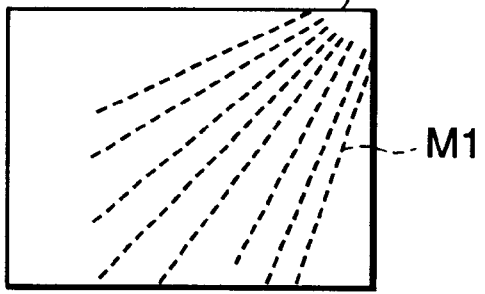
FIG. 20D depicts a still further succeeding fourth one of the four exemplary frame images.
Figure 21A:
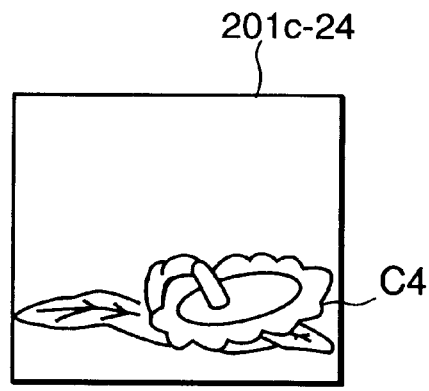
FIG. 21A depicts a leading frame image of four exemplary frame images of the movie data B1 to B300 shown in FIG. 19.
Figure 21B:
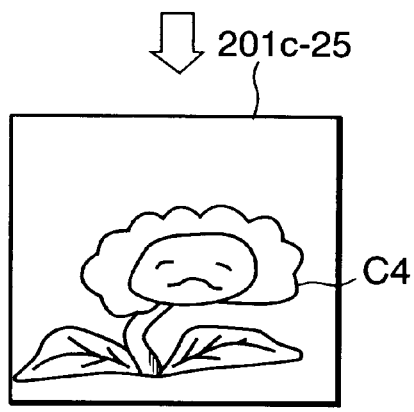
FIG. 21B depicts a succeeding second one of the four exemplary frame images.
Figure 21C:
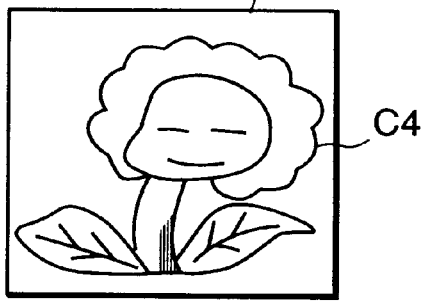
FIG. 21C depicts a further succeeding third one of the four exemplary frame images.
Figure 21D:
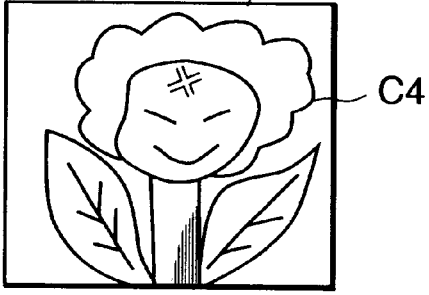
FIG. 21D depicts a still further succeeding fourth one of the four exemplary frame images.

FIG. 12 shows an example of the virtual world and the position of the viewpoint at the start of localized reproduction of the movie. A television monitor TV21 provided on a television stand TB is initially viewed from a viewpoint VP located on a near left side of the screen of the television monitor TV21, and the viewpoint VP is moved to the right, as shown in the figure.

Concretely, the virtual world storing unit 202 stores the 3D graphics data 201*a* representative of the shapes etc. of the objects TB and TV21 placed by the object placing unit 210 and the placement positions of the objects in the three-dimensional virtual space. Based on instructions issued by the control unit 217, the viewpoint moving unit 218 moves the viewpoint VP, and the perspective projection transformation unit 213 generates image data defined by the screen coordinate system, representative of an image of those objects as viewed from the moved viewpoint VP. Initially, an image is displayed on the monitor display 156 which is obtained when those objects are viewed, as shown in FIG. 12, from a near left side of the screen of the television monitor TV21. In the present example, the polygon P21 representing the screen of the television monitor TV21 is specified as a target polygon to which movie data is to be mapped.

FIGS. 13A to 13D depict four exemplary frame images 201C-5 to 201C-8 of the movie data 201*c* used as a texture in the third example. The leading frame image 201C-5 depicts a baseball player when he is in a waiting state for a ball. The succeeding second frame image 201C-6 depicts an intermediate state where he has just started swinging. The further succeeding third frame image 201C-7 depicts an advanced state just after he has just hit the ball. The still further succeeding fourth frame image 201C-8 depicts his follow-through swing. The movie data 201*c* used represents a movie which shows a baseball player swinging a bat, and contains 180 frame images in total. The frame images 201C-5 to 201C-8 shown are four representative images of the 180 frame images. Concretely, The movie data 201*c* represents such a batter's swing form by dividing the swing form into successive frame images, and the movie data 201*c* is stored in the graphics/image data storing unit 201.

FIGS. 14A to 14D depict four exemplary display screen images 301*h* to 301*k* which are sequentially displayed when the localized reproduction of the movie and the movement of the position of the viewpoint are processed in parallel in the third example. The leading display screen image 301*h* depicts a television monitor TV21 viewed from a near left side of its screen, which shows the baseball player waiting for a ball. The succeeding second display screen image 301*i* depicts the television monitor TV21 as viewed from a little left side of the front of its screen after the viewpoint has been moved to the right. The screen shows start of his swing. The further succeeding third display screen image 301*j* depicts the television monitor TV21 viewed from a little right side of the front of its screen after the viewpoint has been moved further to the right. The screen shows that he has just hit the ball. The still further succeeding fourth display screen image 301*k* depicts the television moniOtor TV21 viewed from a near right side of its screen after the viewpoint has been moved still further to the right. The screen shows his follow-through swing. The position of the viewpoint from which objects such as the television monitor TV21, etc. are viewed is moved from a near left side of the screen of the television monitor TV21 to a near right side. In parallel to movement of the viewpoint, a moving picture showing the baseball player swinging the bat is displayed on the screen of the television monitor TV21.

Concretely, whenever one of the frame images constituting the movie data 201*c* is mapped to the polygon P21 representative of the screen of the television monitor TV21 (step S201 to S210), the viewpoint moving unit 218 rotates the viewpoint VP by an angle of 0.5 degree around the television monitor TV21 and in parallel to the XZ plane (step S102). If such processing is repeated 180 times, the viewpoint VP is rotated by 90 degrees around the television monitor TV21 in three seconds. Thus, it is possible to display a high level movie where localized reproduction of the movie and movement of the position of the viewpoint progress in parallel.

[Fourth Example]

The fourth example is an example of displaying change of a form of part of a moving object, by mapping movie data as texture data to moving polygons placed in the three-dimensional virtual space. To be more specific, in an example shown below, a character is a moving object, and change of his expression is produced with easiness and reality when he narrows his eyes while changing direction of his face.

FIG. 15 shows an example of an object which moves in the three-dimensional virtual space and a group of polygons of the object which are a target of localized reproduction of a movie in the fourth example. An aspect is shown where the character C3 rotates his head to the left about 90 degrees from times T1 to T4. The target polygons to which a movie is to be mapped are a polygon group P3 which includes three mutually adjacent polygons which enclose both eyes of the character C3. Such movement of the character C3 is realized by the processing (steps S101 to S105), which mainly includes movement of the object in the three-dimensional virtual space by the object moving unit 211.

FIGS. 16A to 16D depict four exemplary frame images 201C-9 to 201C-12 of the movie data 201*c* used as a texture in the fourth example. The leading frame image 201C-9 depicts an initial state of both eyes indicative of a glaring look. The succeeding second frame image 201C-10 depicts an intermediate state where softening of the look has started. The further succeeding third frame image 201C-11 depicts an advanced state where the look has been softened furthermore. The still further succeeding fourth frame image 201C-12 depicts a smiling look. The moving picture shows gradual change of the look in the eyes from an angry look to a smiling look, and includes 120 frame images in total. Four representative frame images 201C-8 to 201C-11 from the 120 frame images are shown. Respective frame images depict expressions of both eyes mapped sequentially to the polygon group P3. Suchmovie data 201*c* is stored in the graphics/image data storing unit 201. Thus, the movie data 201*c* is used to realistically represent expression of a specific region of the face.

FIGS. 17A to 17D depict four exemplary display screen images 301*p* to 301*s* which are sequentially displayed when localized reproduction of a movie is executed in the fourth example. The leading display screen image 301*p* depicts an initial state of the character C3 where he has a glaring look. The succeeding second frame image 301*q* depicts an intermediate state where he has started to soften his look. The further succeeding third frame image 301*r* depicts an advanced state where he has soften his look furthermore. The still further succeeding fourth frame image 301*s* depicts his smiling look. An aspect is realistically and expressively shown where the character C3 softens a glaring look as he rotates his head to the left. Use of the movie enables the form of the eyes to be changed smoothly.

Such parallel processing (two independent parallel movements of the head and the eyes) differs from the third example in that the position of the viewpoint is not moved, but processing of visualizing the three-dimensional virtual space as a two-dimensional image is executed, with the virtual world object moving unit 211 changing the position of the character C3 in the three-dimensional virtual space little by little.

In the localized-reproduction processing, the texture mapping unit 212 reads three successive partial areas from a frame image stored in the texture area TR1 (or the texture area TR2), based on the three texture address data TRn (U1, V1), TRn (U2, V2) and TRn (U3, V3) corresponding to the polygons constituting the polygon group P3, and maps them respectively to the three polygons of the polygon group P3 (step S201 to S210). The texture address data of respective polygons are set so that rectangular areas corresponding to respective polygons are located at successive locations in the texture area.

Even if the target object at which the moving picture is to be displayed moves in the three-dimensional virtual space, the movie data is mapped to the specific polygon. So, localized reproduction of the movie to the moving object is easily achieved. In addition, by mapping movie data to a specific region of which expression should be changed, within a face, expression of that region can be realistically changed. For example, the forms of eyes can be smoothly changed. Similarly, it is effective to map movie data to other regions of which forms should be changed, like a mouth. Furthermore, it is effective to map two different movies simultaneously to the first region including both eyes and to the second region including a mouth, respectively. For that purpose, the second movie data representative of change of expression of the mouth is further recorded in CD-ROM 154 beforehand, in addition to the first movie data representative of change of expression of the eyes, as used in the fourth example. When a face object is placed in the virtual three dimensional space, the second region is further specified as a region to which the above mentioned second movie data is to be mapped. Both the first and second movie data are read from CD-ROM 154 in parallel, and are respectively mapped to the first and second regions in parallel. A method of mapping two different types of movie data is shown in the fifth example, explained next.

[Fifth Example]

The fifth example is an example of simultaneously displaying two different kinds of movie pictures, by mapping them to two polygons placed in the three-dimensional virtual space. To be more concrete, in an example given below, an aspect is effectively produced where an almost dead flower character recovers in response to watering the flower character.

FIG. 18 shows a display screen 301 showing a scene of a game at a start of localized reproduction of a movie. The ground G1 is shown at a lower position in the display screen, and the mouth of a watering can J1 is shown at an upper location in the display screen. Two rectangular polygons Pa and Pb are located as shown in the figure. The polygon Pa is for displaying movement of water which comes out of the mouth of the watering can J1. The polygon Pb is for displaying movement of the flower character.

FIG. 19 shows a frame structure of movie data used as a texture in the fifth example, that is, the arrangement of the frame images constituting the movie data 201c in the fifth example as stored in the graphics/image data storing unit 201. The movie data 201c comprises two kinds of independent movies, A and B. The movie A represents an aspect where water coming out of the watering can J1 drops from the right upper location in the display screen to the left lower location. The movie A comprises 300 frame images A1 to A300 and continues for five seconds. The movie B represents an aspect where a wilted flower character recovers. The movie B comprises 300 frame images B1 to B300 and continues for five seconds. The frame images of the movies A and those of the movie B are arranged alternately frame image by frame image in the graphics/image data storing unit 201.

FIGS. 20A to 20D depict four representative frame images 201C-20 to 201C-23 from the movie data A1 to A300, for representing flow of water M1, shown in FIG. 19. The leading frame image 201C-20 depicts an initial state of a rather strong flow of water M1 with rather wide spread of water. The succeeding second frame image 201C-21 depicts a state of the flow of water M1 after elapse of time where the strength of the flow of the water M1 and the range of its spread keep unchanged. The further succeeding third frame image 201C-22 depicts a state of the flow of the water M1 after further elapse of time where the flow of the water M1 has been weakened and the range of its spread has been narrowed. The still further succeeding fourth frame image 201C-23 depicts a state of the flow of the water M1 after further elapse of time where the strength of the flow of the water M1 keeps weakened and the range of its spread keeps narrowed. FIGS. 21A to 21D depict four representative frame images 201C-24 to 201C-27 from the movie data B1 to B300, shown in FIG. 19, and an aspect is shown where the flower character C4 recovers. The leading frame image 201C-24 depicts an initial state of the flower character C4 where it is in a wilted state. The succeeding second frame image 201C-25 depicts an intermediate state of the flower character C4 where it has started recovering. The further succeeding third frame image 201C-26 depicts an advanced state of the flower character C4 where it has recovered considerably. The still further succeeding fourth frame image 201C-27 depicts a further advanced state of the flower character C4 where it has completely recovered. All the frame images constituting these movies are image data with color information of translucency, like the first example.

Figure 22:
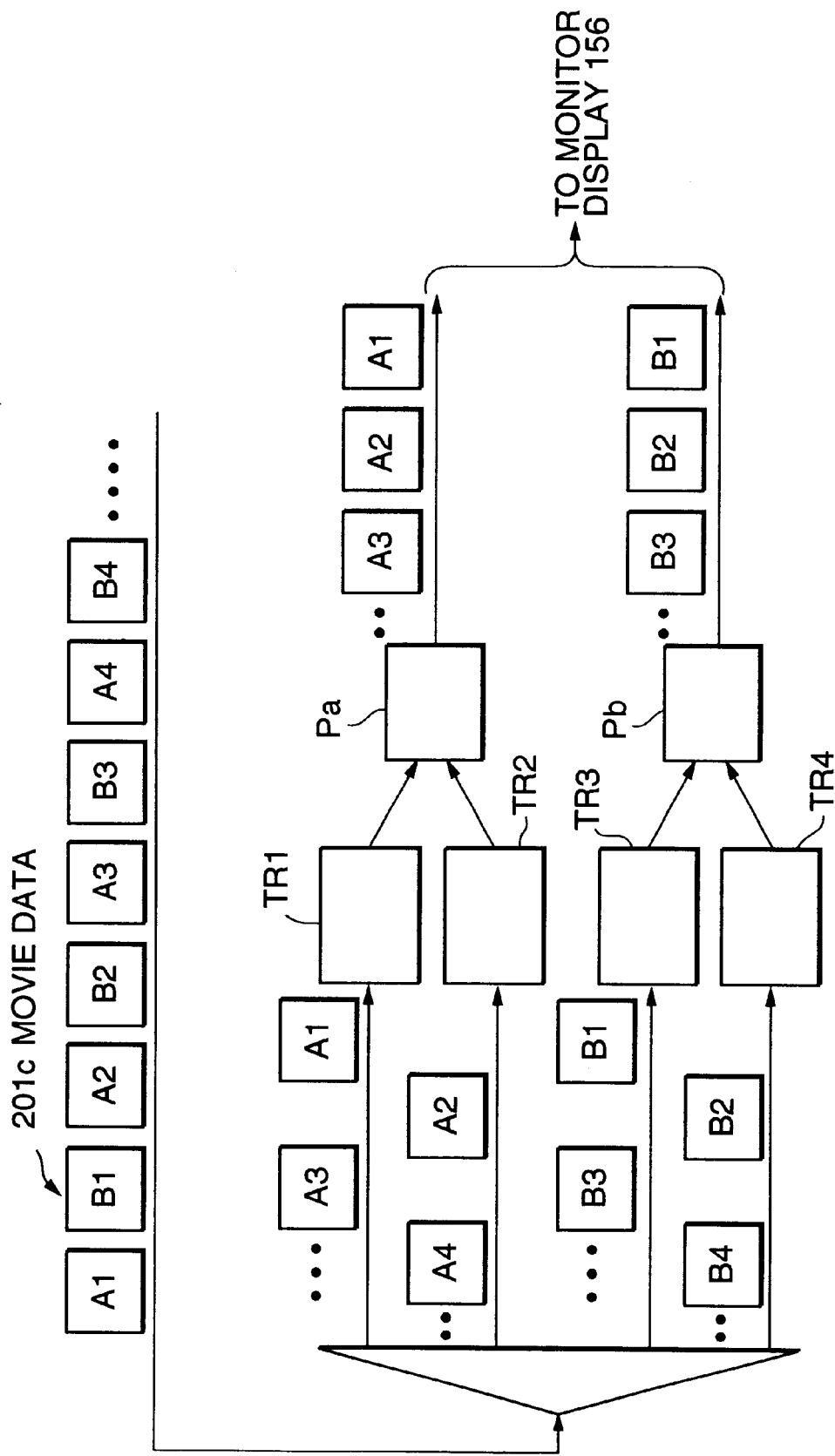
FIG. 22 is a data relation diagram which shows a relationship between the polygons Pa and Pb and texture data to be mapped thereto, in accordance with the fifth example.
Figure 23A:
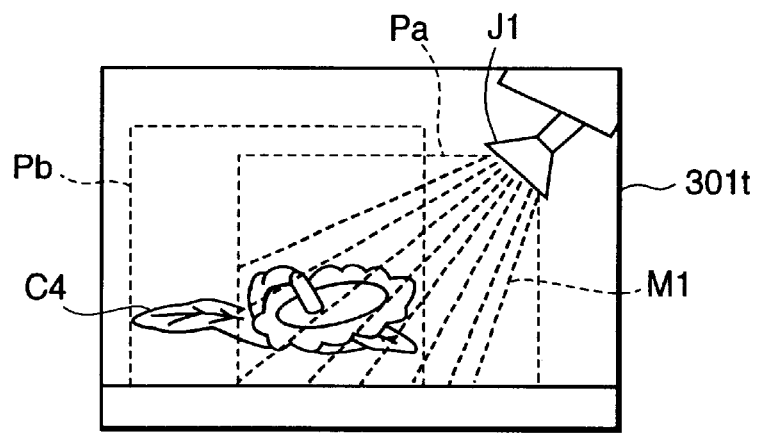
FIG. 23A depicts a leading display screen image of four exemplary display screen images which are sequentially displayed when localized reproduction of a movie is executed, in accordance with the fifth example.
Figure 23B:
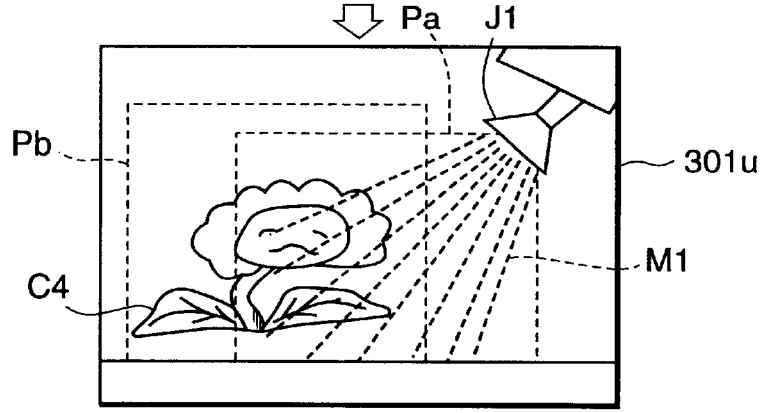
FIG. 23B depicts a succeeding second one of the four exemplary display screen images.
Figure 23C:
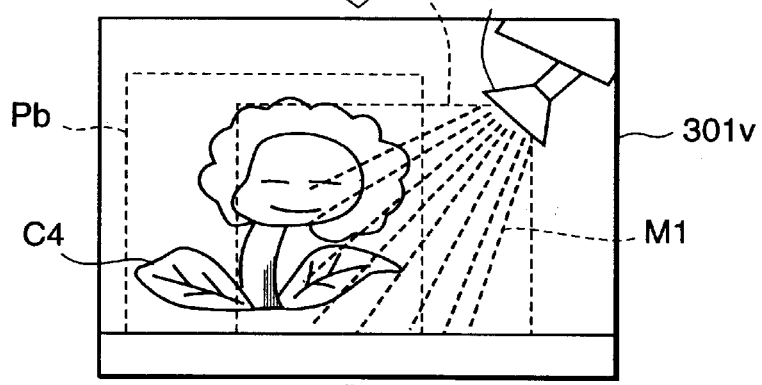
FIG. 23C depicts a further succeeding third one of the four exemplary display screen images.
Figure 23D:
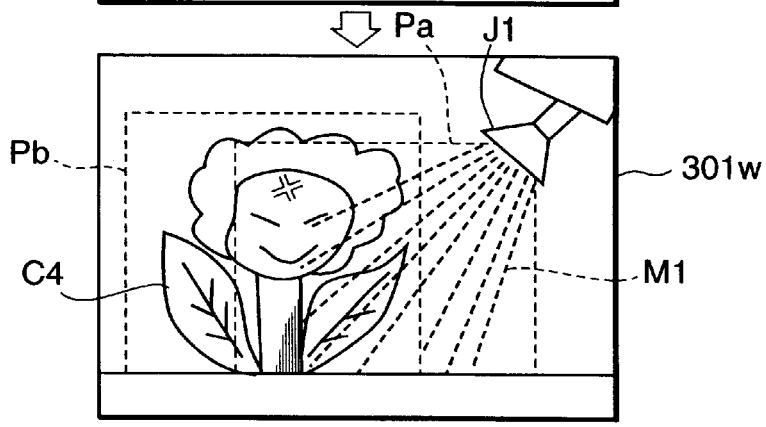
FIG. 23D depicts a still further succeeding fourth one of the four exemplary display screen images.

FIG. 22 is a data relation diagram indicating the relation between the polygons Pa and Pb, and the movie data 201c which should be mapped to them. Two texture areas TR1 and TR2 are used as texture buffers for the polygon Pa. Frame images of odd frame numbers of the movie data A are sequentially stored in the texture area TR1, and frame images of even frame numbers of the movie data A are sequentially stored in the texture area TR2. Two other texture areas TR3 and TR4 are used as texture buffers for the polygon Pb. Frame images of odd frame numbers of the movie data B are sequentially stored in the texture area TR3, and frame images of even frame numbers of the movie data B are sequentially stored in the texture area TR4. When a display image of an odd frame number is to be generated, a frame image stored in the texture area TR1 is used as a texture for the polygon Pa, and a frame image stored in the texture area TR3 is used as a texture for the polygon Pb. When a display image of an even frame number is to be generated, a frame image stored in the texture area TR2 is used as a texture for the polygon Pa, and a frame image stored in the texture area TR4 is used as a texture for the polygon Pa.

To be more specific, the image data reading unit 215 reads one of the frame images of the movie data A and a corresponding one of the frame images of the movie data B from the graphics/image data storing unit 201, that is, from CD-ROM 154 at the same time. The image data transferring unit 214 responds to a drawing instruction issued by the control unit 217, and stores the one frame image of the movie data A as read and the corresponding one frame image of the movie data B as read into the texture data buffer unit 204, in such a manner that the one frame image of the movie data A as read and the corresponding one frame image of the movie data B as read are respectively stored either into the texture areas TR1 and TR3 or into the texture areas TR2 and TR4. Each time when a pair of frame images of the movie data A and the movie data B are read from the graphics/image data storing unit 201, the pair of the texture areas TR1 and TR3 and the pair of the texture areas TR2 and TR4 are switched alternately, and the pair of the frame images as read are stored into a pair of texture areas determined by the switching.

For example, the frame image A1 and B1 read together from the movie data 201c are stored in the texture areas TR1 and TR3, respectively. The frame image A2 and B2 read together next are stored in the texture areas TR2 and TR4, respectively.

FIGS. 23A to 23D depict four exemplary display screen images 301t to 301w which are sequentially displayed when localized reproduction of movie data is executed in the fifth example. The leading display screen image 301t depicts that the flower character C4 is in a wilted state and the watering can J1 sprinkles rather strong water M1 to it. The succeeding second frame image 301u depicts that the flower character C4 has started recovering and the watering can J1 keeps sprinkling rather strong water M1 to it. The further succeeding third frame image 301v depicts that the flower character C4 has recovered considerably and the flow of the water M1 has been weakened. The still further succeeding fourth frame image 301w depicts that the flower character C4 has completely recovered and the flow of the water M1 keeps weakened. An aspect is realistically shown where the watering can J1 sprinkles water M1 to the flower character C4, and latter changes from a wilted state into a vibrant state. The movie A representing the translucent color water M1 is mapped as a texture to the polygon Pa located nearest, and in parallel to the mapping, the movie B representing the flower character C4 is mapped as a texture to the polygon Pb located at a far location of the polygon Pa. So, the flower character C4 located behind the falling water shows through.

Such processing is basically achieved by the same procedure as the flow shown in FIG. 7, but it differs from other operation examples in that one movie is not reproduced but two different movies are reproduced in parallel.

Figure 24:
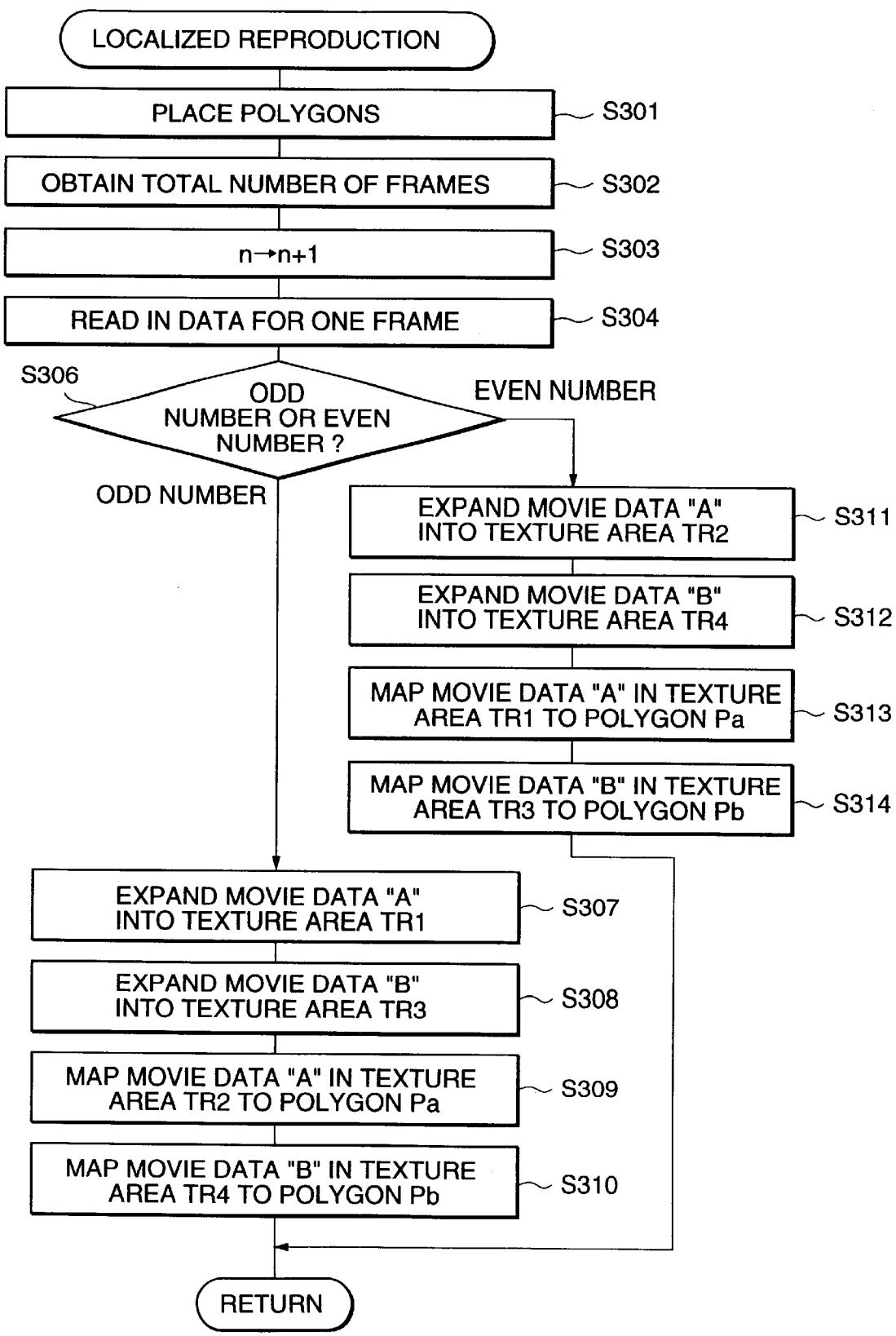
FIG. 24 is a flowchart of a localized-reproduction processing procedure executed by the game apparatus, in accordance with the fifth example.

FIG. 24 is a flowchart of the procedure of the localized-reproduction processing in the fifth example. What differ from the flow shown in FIG. 7 is as follows.

At placement of a polygon (step S301), the two polygons Pa and Pb are placed (specified) among polygons of which placement positions are already stored in the virtual world storing unit 202. At reading of data for one frame (step S304), one frame image for each of the two movies A and B is read, that is, two successive frame images of the movie data 201c are read. The frame number n shown in this flow is not a serial number within the movie data 201c, but a frame number in each of the movie A and B. That is, the frame number n corresponds to the subscript of the symbols A and B shown in FIG. 22.

When the frame number n has been judged as an odd number (step S306), the two frame images as read by the image data reading unit 215 are expanded respectively into the texture areas TR1 and TR3 by the image data transferring unit 214 (steps S307 and S308). In parallel to the expansion, the two frame images already expanded respectively into the texture areas TR2 and TR4 are mapped to the polygons Pa and Pb, respectively by the texture mapping unit 212 (steps S309 and S310).

When the frame number has been judged as an even number (step S306), the two frame images as read by the image data reading unit 215 are expanded respectively into the texture areas TR2 and TR4 by the image data transferring unit 214 (steps S311 and S312). In parallel to the expansion, the two frame images already expanded respectively into the texture areas TR1 and TR3 are mapped to the polygons Pa and Pb, respectively by the texture mapping unit 212 (steps S313 and S314).

As a result, localized reproduction of two different movies respectively to the two polygons Pa and Pb progresses in parallel, as shown in FIG. 22. For example, during the first 1/60 second, an image is displayed in which the polygon Pa is mapped with the frame image A1, and the polygon Pb is mapped with the frame image B1. During the next 1/60 second, an image is displayed in which the polygon Pa is mapped with the frame image A2, and the polygon Pb is mapped with the frame image B2.

As explained above, two kinds of movies are locally reproduced on different polygons in the fifth example. The movie data used for such animation does not include a composite image of the two animations as a frame image, but includes two independent frame images arranged alternately. This enables use of an animation, which involves multiple movements. That is, such animation is decomposed into multiple partial movements or multiple simple movements, and movie data representing such partial movements or simple movements independently are prepared. Simultaneous display of such movements can be easily realized by using the movie data thus prepared, as in the fifth example. For example, as mentioned before, two different movies can be mapped simultaneously to a region including both eyes and a region including a mouth within the same face, by using the mapping method of the present operation example.

The game apparatus according to the present invention has been explained, based on an embodiment, but the present invention is not limited to the embodiment.

For instance, in the operation examples explained above, the texture data stored in the texture data buffer unit 204 is mapped to a polygon as it is, but each picture element data of the texture data may be transformed to a corresponding color, by referring to a color look-up table, before the texture data is mapped.

Figure 25:
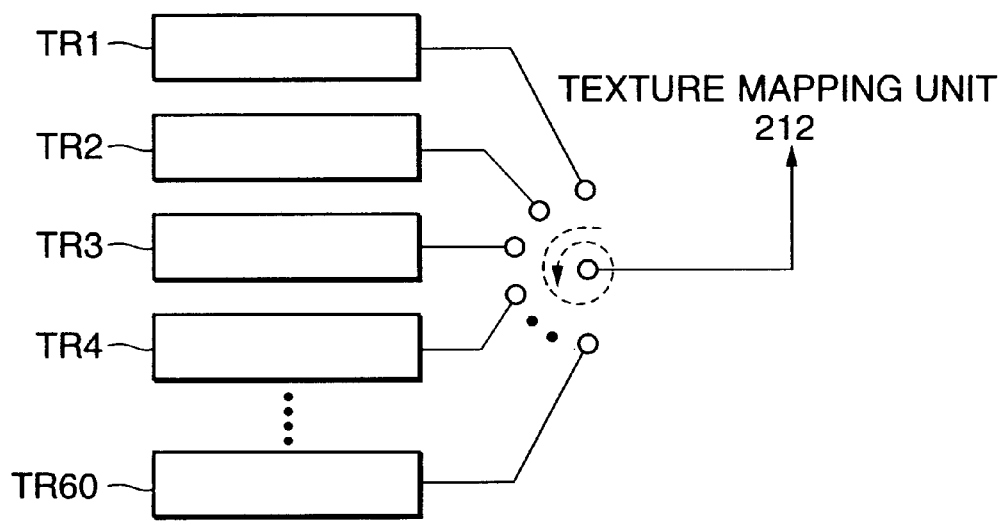
FIG. 25 explains processing of 10 times repetition of sequential mapping of 60 texture data to a polygon.

In the operation examples explained above, a movie was reproduced only once, but reproduction of the same movie may be repeated two or more times. For instance, movie data for one second which comprises 60 image data is read from the graphics/image data storing unit 201, and, as shown in FIG. 25, the 60 image data are respectively stored in the 60 texture areas TR1 to TR60 in the texture data buffer unit 204 as texture data. The 60 texture data stored in the 60 texture areas TR1 to TR60 are sequentially read at an interval of 1/60 second and are mapped to the same polygon. The mapping operation is repeated 10 times. As a result, localized reproduction of the movie data can be repeated as long as 10 seconds, without rewriting the texture data stored in the texture data buffer unit 204.

In the embodiment explained above, texture data mapped to a polygon is image data stored in the texture data buffer unit 204, but display image data stored in the display image data buffer unit 203 may be mapped as texture data. What is needed for that purpose is to change the texture address data designating a texture to be mapped to a polygon, to an address of a storage area in the display image data buffer unit 203.

In the embodiment, the double buffering method is adopted by which internal buffer areas in each of the texture data buffer unit 204 and the display image data buffer unit 203 are switched by a frequency of 60 Hz, but, the switching frequency may be changed freely.

For instance, when 1/15 seconds is required to read image data from the graphics/image data storing unit 201, the data reading operation may be executed by the image data reading unit 215 in units of ⅕₁₅ seconds, and the same image data stored in the image data buffer unit 205 may be transferred two or more times by the image data transferring unit 214.

A variety of embodiments may be realized by combining the operation examples explained above. For instance, by combining the second and fifth examples, it is possible to display an aspect where an animation of the first channel is displayed on three television monitors among the six television monitors arranged in an electric appliance shop, and an animation of the second channel is displayed on the other three monitors. That is, it is possible to map animations to different polygons. In addition, by combining the third and fourth examples, it is possible to move the object in the three-dimensional virtual space and to move a viewpoint for perspective projection transformation at the same time.

In the operation examples explained above, localized reproduction of a movie uses a rectangular polygon, but it is also possible to execute localized reproduction of a movie to a triangular polygon.

In the embodiment explained above, the present invention is realized with a home game machine as a platform. However, the present invention can be realized by using, as a platform, a general computer such as a personal computer, an arcade game machine, or a communication terminal such as a portable telephone, a portable digital assistant or a car navigator.

In the embodiment, a CD-ROM storing a program and data to realize the present invention is used as a recording medium. However, the recording medium is not limited to CD-ROM, but other computer readable magnetic or optical recording mediums or semiconductor memories may be used.

Moreover, the present invention is not limited to a manner of supplying the program or data for realizing the present invention by a recording medium such as CD-ROM which is detachable from a game machine or a computer. That is, the program and data for realizing the present invention can be downloaded from other equipment connected to the network 121, through the telecommunication line 120 by the communication interface 107 shown in FIG. 1, as a carrier wave frequency-modulated or phase-modulated according to the data stream.

As mentioned above, the present invention maps movie data to a polygon for each display screen image, so localized display of a moving picture on the screen is achieved, and the effect of production by displaying a moving picture is enhanced, compared to the conventional art.

That is, the effect of production by a movie is improved with a light processing load, so it is possible to display a moving picture in such a manner that real time display and interactive operations are improved.

Especially, expression of a specified region in a face image object can be changed smoothly, when movie data representing change in expression of the region is recorded on a recording medium beforehand, and a movie based on the movie data is mapped to that specified region. Moreover, the movie data representing change in expression of the region can be used as a texture successively, when movie data is read from the recording medium and is stored into a memory having multiple areas that can be switched, and a preceding portion of the movie data already stored in one of the areas is read out and used as a texture, in parallel to the storing operation.

The present disclosure relates to subject matter contained in priority Japanese Patent Application No. HEI 11-067428, filed on Mar. 12, 1999, the contents of which is herein expressly incorporated by reference in its entirety.

What is claimed is:

1. A game apparatus, comprising:
    a CD-ROM recording a game program and movie data used at execution of said game program; and
    a CPU for reading said game program from said CD-ROM, for executing a game, for reading said movie data from said CD-ROM, and for displaying a movie;
    wherein control by said CPU includes:
    placing a predetermined face image object in a virtual space;
    specifying, in polygon units, a region of which expression should be changed within said placed face image object;
    reading movie data predetermined in correspondence to said specified region and recorded in said CD-ROM, for representing change in expression of said specified region; and
    mapping a movie based on said read movie data to said specified region as a texture, and causing expression of said specified region to be changed and displayed.

2. The game apparatus according to claim 1,
    wherein said specified region is at least part of a face object of a moving object comprised of a plurality of polygons;
    wherein said control by said CPU further includes causing a position on a display screen of said specified region, following movement of said moving object.

3. The game apparatus according to claim 2,
    wherein said control by said CPU further includes storing said movie data read from said CD-ROM into a memory which has a plurality of areas for storing said movie data, while switching said plurality of areas in the course of reading said movie data;
    wherein said mapping includes mapping said movie to said specified region as a texture, based upon said movie data stored in one of said plurality of switched areas.

4. The game apparatus of claim 1 wherein the specified region is capable of being changed independently of movement of a face image portion, the face image portion being the face image object that is outside the specified region.

5. A method of displaying a movie by reading a game program from a CD-ROM which stores said game program and movie data used at execution of said game program, executing a game, reading said movie data and causing a movie to be displayed, said method comprising:
    placing a predetermined face image object in a virtual space;
    specifying, in polygon units, a region of which expression should be changed within said placed face image object;
    reading movie data predetermined in correspondence to said specified region and recorded in said CD-ROM, for representing change in expression of said specified region; and
    mapping a movie based on said read movie data to said specified region as a texture, and causing expression of said specified region to be changed and displayed.

6. The method according to claim 5,
    wherein said specified region is at least part of a face object of a moving object comprised of a plurality of polygons;

wherein said method further comprises causing a position on a display screen of said specified region, following movement of said moving object.

7. The method according to claim 6, further comprising storing said movie data read from said CD-ROM into a memory which has a plurality of areas for storing data, while switching said plurality of areas in the course of reading said movie data; and wherein said mapping includes mapping said movie to said specified region as a texture, based upon said movie data stored in one of said plurality of switched areas.

8. The method of claim 5 wherein the specified region is capable of being changed independently of movement of a face image portion, the face image portion being the face image object that is outside the specified region.

9. A game program product recorded on a computer readable recording medium which stores a game program and movie data to be used at execution of said game program, wherein said game program causes a computer to execute, the game program comprising:

placing a predetermined face image object in a virtual space;

specifying, in polygon units, a region of which expression should be changed within said placed face image object;

reading movie data predetermined in correspondence to said specified region and recorded in said CD-ROM, for representing change in expression of said specified region; and mapping a movie based on said read movie data to said specified region as a texture, and causing expression of said specified region to be changed and displayed.

10. The game program product according to claim 9, wherein said specified region is at least part of a face object of a moving object comprised of a plurality of polygons;

wherein said game program further comprises causing a position on a display screen of said specified region, following movement of said moving object.

11. The game program product according to claim 10, wherein said game program further comprises storing said movie data read from said CD-ROM into a memory which has a plurality of areas for storing data, while switching said plurality of areas in the course of reading said movie data;

wherein said mapping includes mapping said movie to said specified region as a texture, based upon said movie data stored in one of said plurality of switched areas.

12. The game program product of claim 9 wherein the specified region is capable of being changed independently of movement of a face image portion, the face image portion being the face image object that is outside the specified region.

* * * * *